(12) United States Patent
Dicle et al.

(10) Patent No.: US 12,441,368 B2
(45) Date of Patent: Oct. 14, 2025

(54) VEHICLE ACTION SELECTION BASED ON SIMULATED STATES

(71) Applicant: Motional AD LLC, Boston, MA (US)

(72) Inventors: Caglayan Dicle, Melrose, MA (US); Benjamin Riviere, Pasadena, CA (US); Eric Wolff, Zephyr, NV (US); Dmitry S. Yershov, Medford, MA (US)

(73) Assignee: Motional AD LLC, Boston, MA (US)

( * ) Notice: Subject to any disclaimer, the term of this patent is extended or adjusted under 35 U.S.C. 154(b) by 330 days.

(21) Appl. No.: 17/658,243

(22) Filed: Apr. 6, 2022

(65) Prior Publication Data

US 2023/0322266 A1  Oct. 12, 2023

(51) Int. Cl.
*B60W 60/00* (2020.01)
*B60W 50/00* (2006.01)
*G05B 13/02* (2006.01)

(52) U.S. Cl.
CPC .... *B60W 60/0027* (2020.02); *B60W 50/0097* (2013.01); *B60W 60/0013* (2020.02); *B60W 60/0015* (2020.02); *G05B 13/0265* (2013.01); *B60W 2050/0022* (2013.01); *B60W 2050/0052* (2013.01); *B60W 2420/403* (2013.01); *B60W 2420/408* (2024.01); *B60W 2556/40* (2020.02);
(Continued)

(58) Field of Classification Search
CPC ......... B60W 60/0027; B60W 50/0097; B60W 60/0013; B60W 60/0015; B60W 2050/0022; B60W 2050/0052; B60W 2420/403; B60W 2420/408; B60W 2556/40; B60W 2720/10; B60W 2720/106; B60W 2720/24; B60W 60/0011; B60W 50/00; B60W 2050/0031; B60W 30/0956; B60W 60/00276; B60W 60/0025; B60W 40/02; B60W 40/10; B60W 2050/0005; B60W 2050/0028; G05B 13/0265; G06V 20/10; G06V 20/56
See application file for complete search history.

(56) References Cited

U.S. PATENT DOCUMENTS 11,565,709 B1 * 1/2023 Caldwell ................ G06N 3/088
11,693,417 B2 * 7/2023 George ................ G05D 1/0221
701/23
(Continued)

FOREIGN PATENT DOCUMENTS

EP   3714345 B1 * 12/2022 ............ B60W 30/00
WO  WO-2021030476 A1 * 2/2021 ............ B60W 30/09
(Continued)

OTHER PUBLICATIONS

Great Britain Office Action issued for Application No. GB 2303530.6, dated Aug. 3, 2023.
(Continued)

*Primary Examiner* — Peter D Nolan
*Assistant Examiner* — Peter Y Ning
(74) *Attorney, Agent, or Firm* — Knobbe, Martens, Olson & Bear, LLP

(57) ABSTRACT

A scene simulation system can use scene data of a scene of a vehicle to generate one or more simulated states and one or more simulated trajectories associated with the one or more simulated states. The system can evaluate the simulated trajectories and select an action for the vehicle based on the evaluation of the simulated trajectories.

19 Claims, 16 Drawing Sheets

(52) U.S. Cl.
CPC ... *B60W 2720/10* (2013.01); *B60W 2720/106* (2013.01); *B60W 2720/24* (2013.01)

(56) References Cited

U.S. PATENT DOCUMENTS

| | | | |
|---|---|---|---|
| 2020/0401892 A1* | 12/2020 | Redding | G06N 3/045 |
| 2021/0046923 A1* | 2/2021 | Olson | B60W 30/095 |
| 2021/0300412 A1* | 9/2021 | Dingli | B60W 50/0098 |
| 2022/0108049 A1* | 4/2022 | Letwin | G08G 9/00 |
| 2022/0332336 A1* | 10/2022 | Weaver | B60W 60/001 |
| 2023/0041975 A1* | 2/2023 | Caldwell | B60W 60/0027 |
| 2023/0085422 A1* | 3/2023 | Huang | B60W 30/0956 |
| | | | 701/26 |
| 2024/0025399 A1* | 1/2024 | Kobilarov | B60W 30/0956 |

FOREIGN PATENT DOCUMENTS

| | | | | |
|---|---|---|---|---|
| WO | WO-2022090800 A1 * | 5/2022 | | B60W 60/001 |
| WO | WO-2022229404 A1 * | 11/2022 | | B60W 30/18163 |
| WO | WO 2022/265901 A1 | 12/2022 | | |
| WO | WO 2023/014885 A1 | 2/2023 | | |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Korean Office Action issued for Application No. KR 10-2023-0045290, dated Dec. 19, 2024.

* cited by examiner

VEHICLE ACTION SELECTION BASED ON SIMULATED STATES

BACKGROUND

Self-driving vehicles typically use multiple types of images to perceive the area around them. Training these systems to accurately perceive an area can be difficult and complicated.

DETAILED DESCRIPTION

Figure 1:
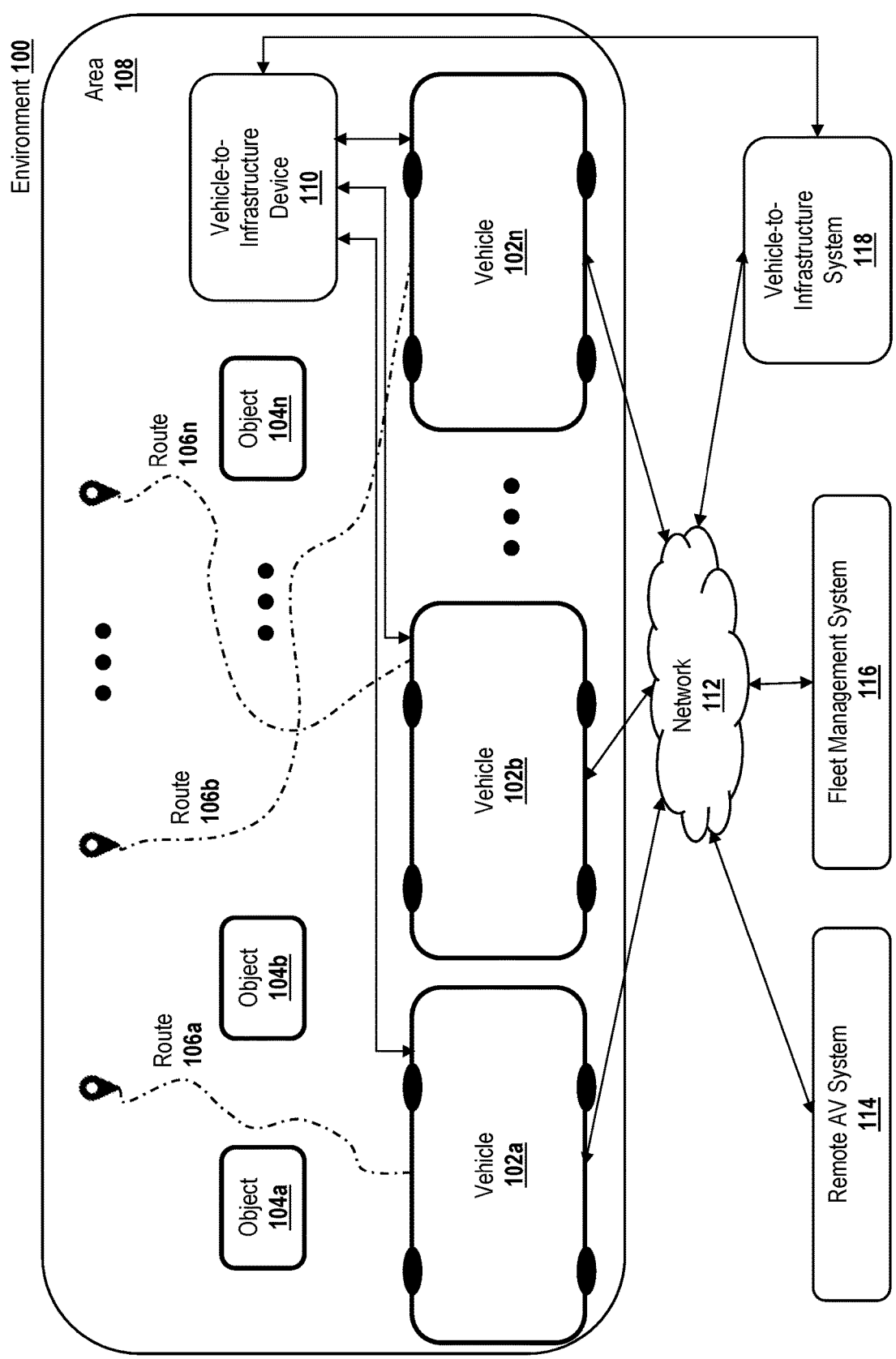
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. Also, the term "or" is used in its inclusive sense (and not in its exclusive sense) so that when used, for example, to connect a list of elements, the term "or" means one, some, or all of the elements in the list. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Overview

Many autonomous vehicles (AVs) implement learning-based planners (sometimes referred to as "learned planners") that learn" from the instances that are presented to them during training. By repeatedly passing over the data, the AV can develop hard-coded rules defining what to do in scenarios presented during training, with predetermined tradeoffs. These tradeoffs can be between factors like the smoothness of the ride and negotiations with other cars, pedestrians, or cyclists. A learned planner tends to work for simple scenarios but often fails in rare or unseen scenarios.

Trajectory planning is how an AV decides what to do at any given moment. For example, trajectory planning can include determining an AV's route, which is characterized by a sequence of actions (also referred to as trajectories) that connect states along which the AV can navigate. Each route can start at an initial state and ends in a final goal state (e.g., a destination) or goal region. Given the large variation in landscapes and structures (e.g., buildings, signs, etc.), as well as the continuous variability and movement of objects (e.g., other vehicles, pedestrians, etc.), it can be challenging to determine a route that efficiently progresses towards a destination and also satisfies other criteria, such as a desired safety level, comfort level, smoothness, etc. Trajectory planning remains a difficult engineering challenge in self-driving, as many AVs implement learning-based planners and are therefore unable to be creative in previously unseen situations.

To address these and other concerns, a planning system can apply a search mechanism to provide exploration and/or reevaluation capabilities to the learned planner. For example, by augmenting a learned planner with a weighted search mechanism, such as Monte Carlo tree search (MCTS), the planning system can utilize a learned planner to generate relevant trajectory proposals and can utilize the search mechanism to evaluate and select a trajectory from the relevant trajectory proposals based on a vehicle planning policy. The synergy of search mechanism and the learned planner can advantageously facilitate a creative and fast planning system.

In light of the description herein, it will be understood that the embodiments disclosed herein substantially improve trajectory planning for autonomous vehicles by enabling an AV to dynamically and flexibly identify and evaluate different trajectories.

General Overview

In some aspects and/or embodiments, systems, methods, and computer program products described herein include and/or implement a testing system that performs trains a perception system end-to-end to identify objects. As a non-limiting example, the testing system can train the perception system by fusing a lidar image with a semantic image (generated by an image semantic network from a camera image), extracting features from the fused image, and modifying at least one network parameter in the image semantic network based on a calculated loss between a ground truth image and the features extracted from the fused image.

By virtue of the implementation of systems, methods, and computer program products described herein, an autonomous vehicle can more accurately identify objects within an image, more accurately identify the location of identified objects within the image, more accurately predict trajectories of identified objects within the image, determine additional features for identified objects, and infer additional information about the scene of an image.

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
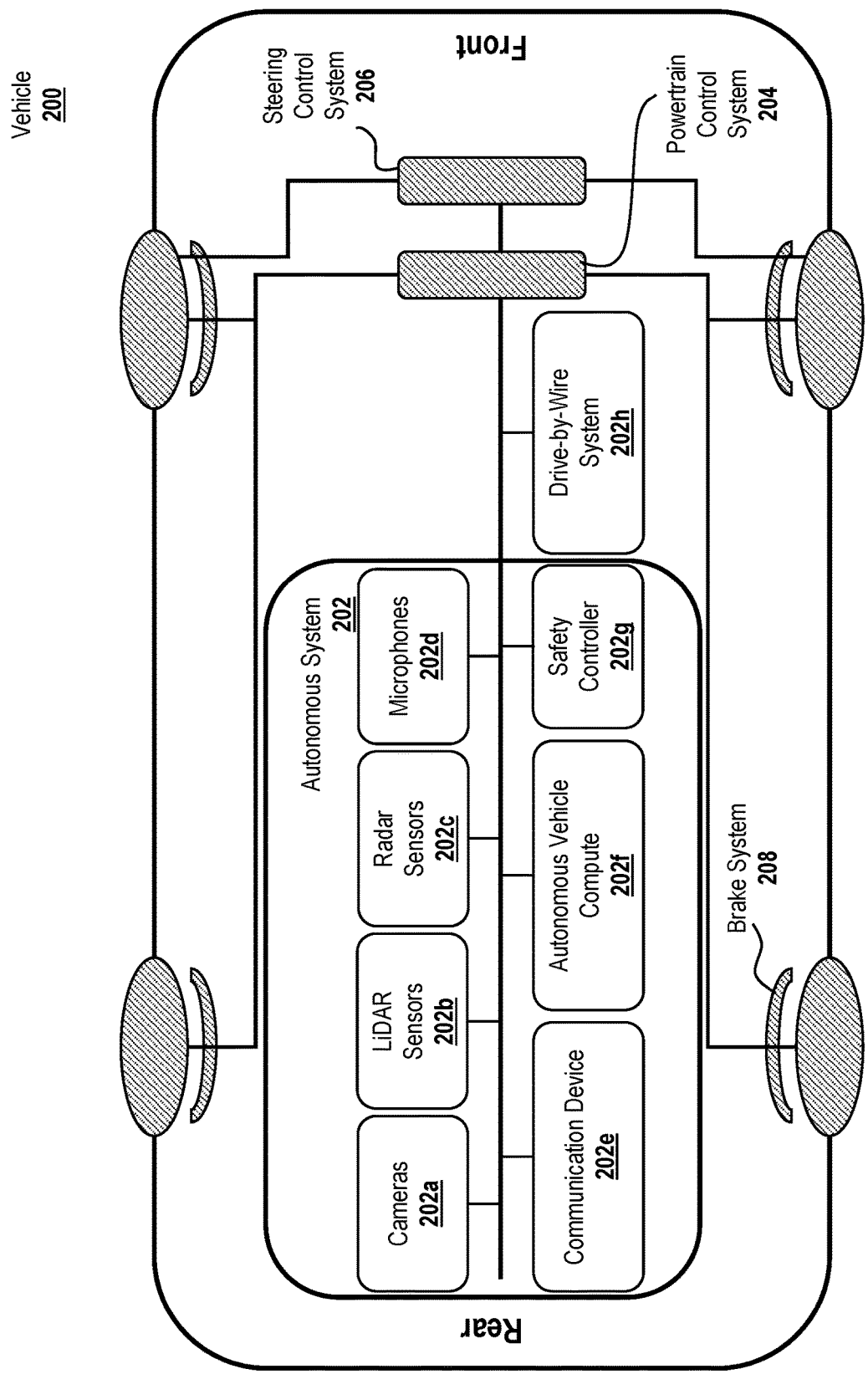
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
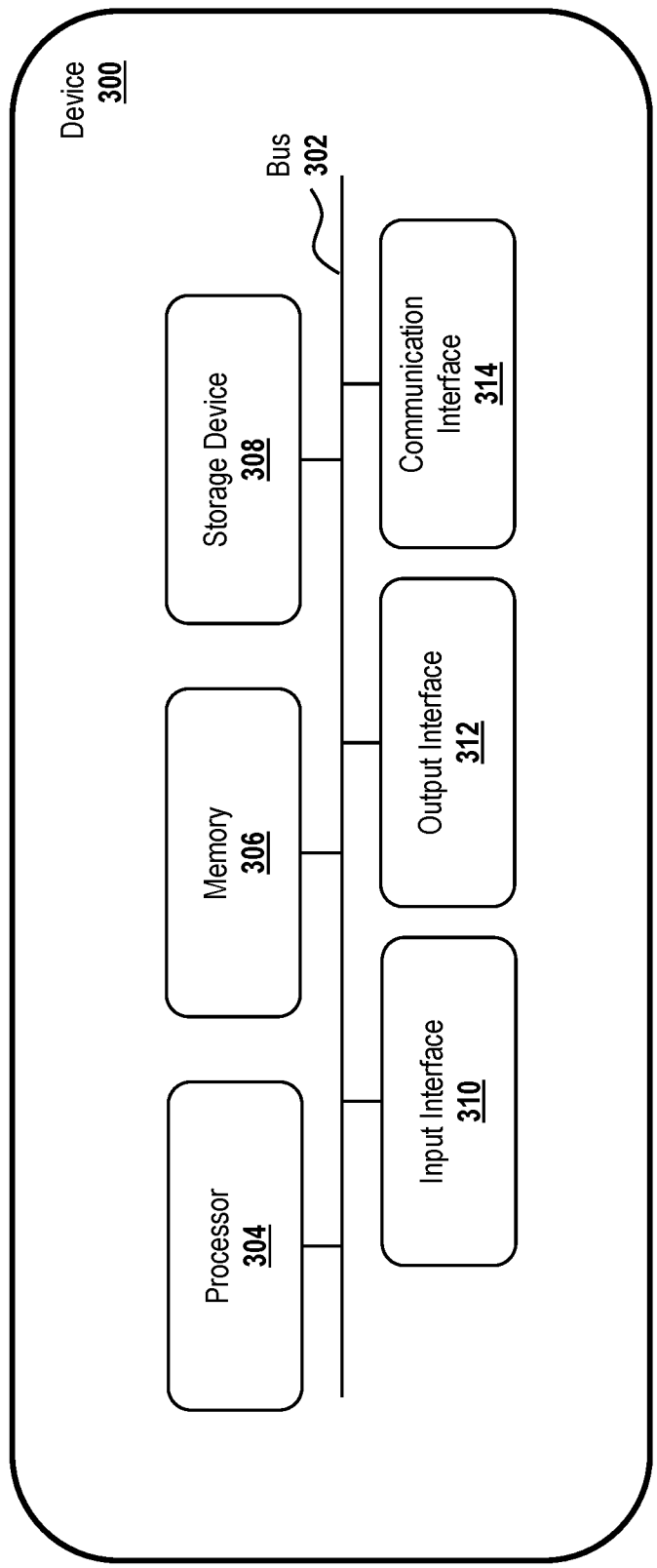
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
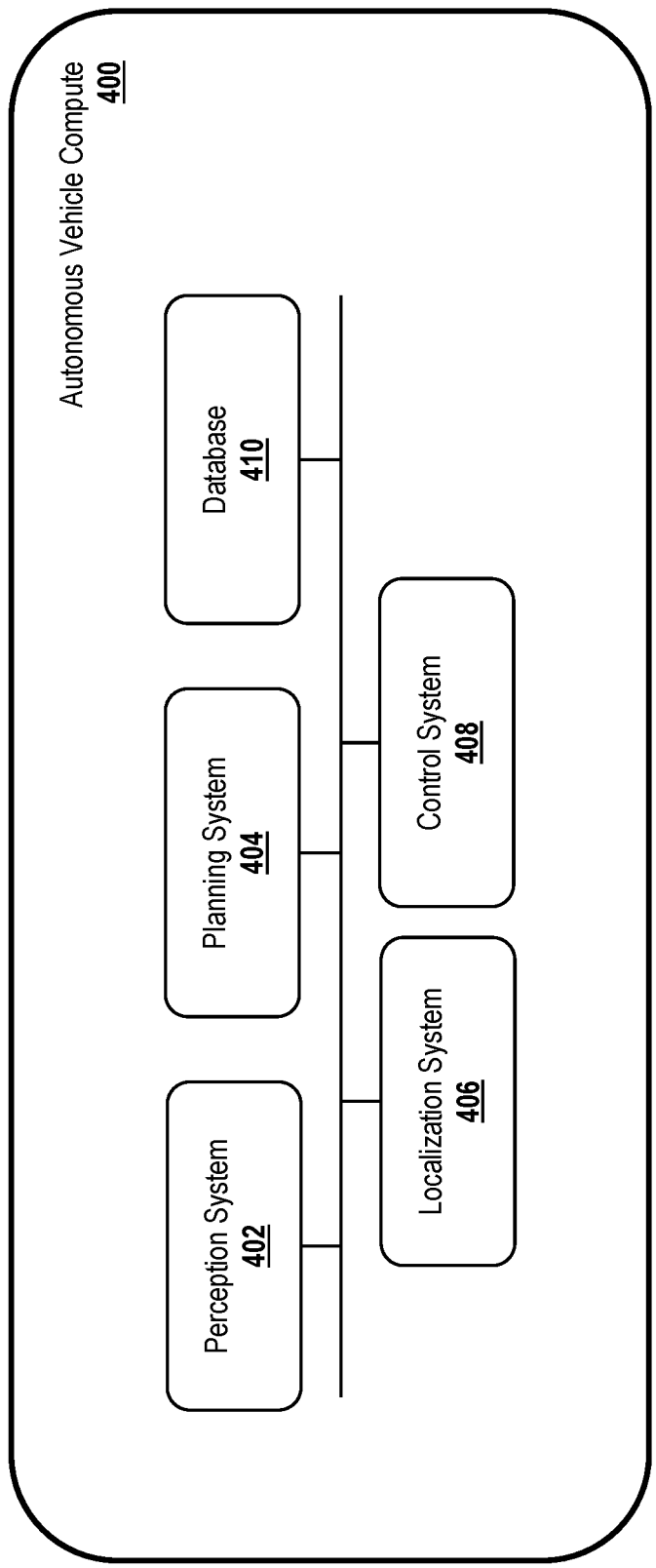
FIG. 4A is a diagram of certain components of an autonomous system.
Figure 4B:
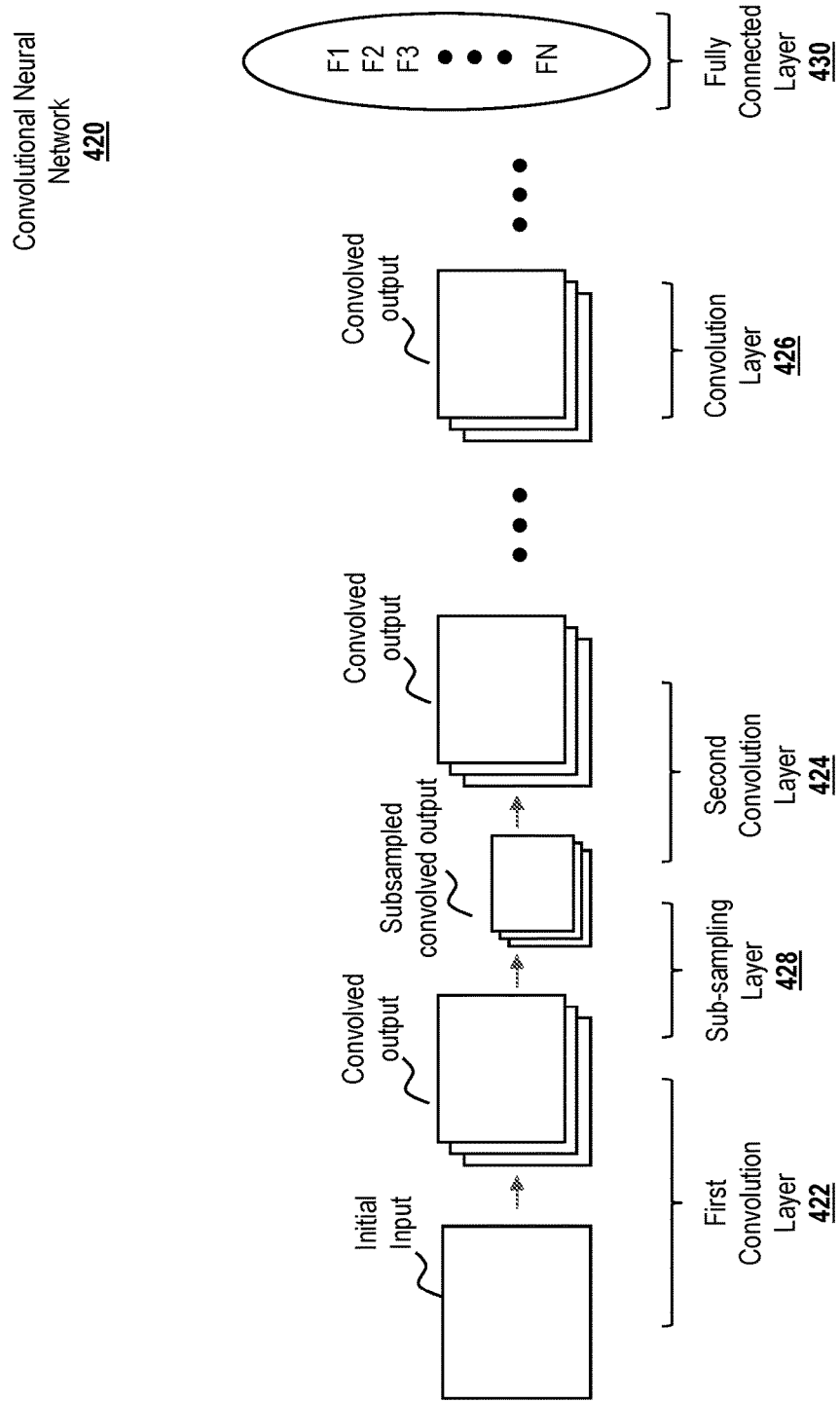
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
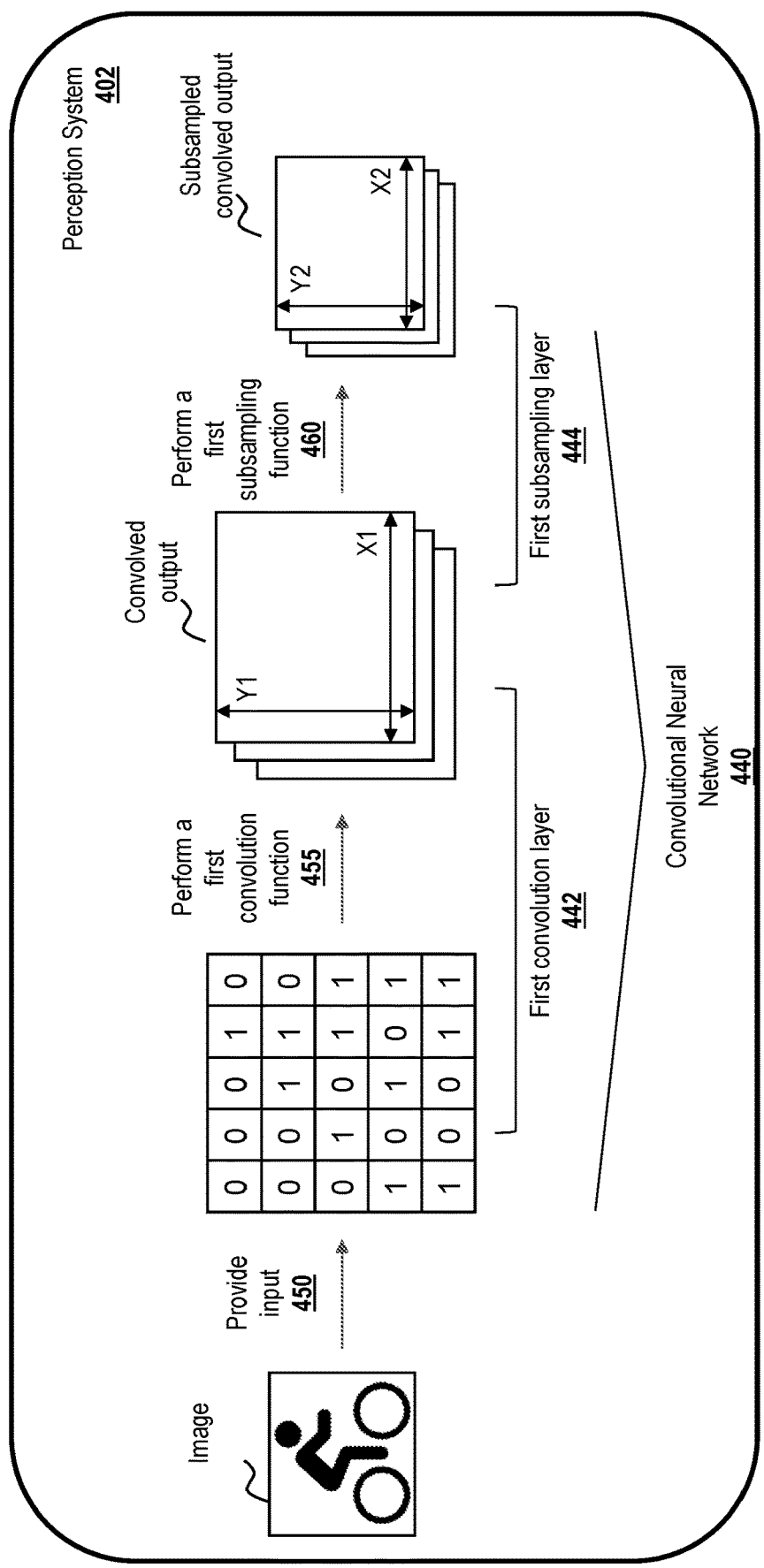
FIGS. 4C and 4D are a diagram illustrating example operation of a CNN.
Figure 4D:
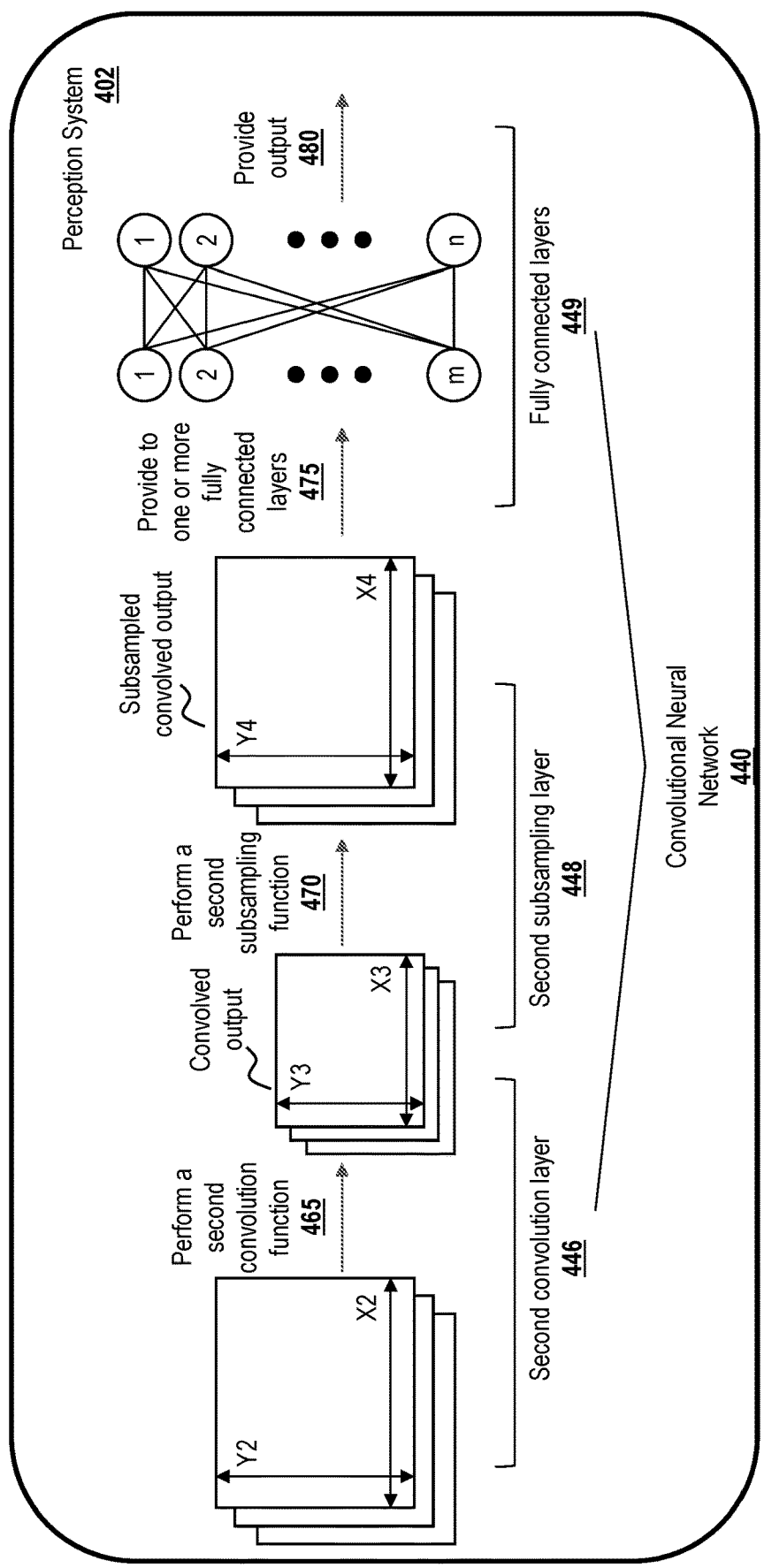

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Dynamic Scene Simulation

Planning safe, smooth, and comfortable trajectories under uncertain and dynamic conditions significantly complicates the controls for autonomous vehicles. In such conditions, pure learning-based planning methods can lack generalization and safety guarantees or the ability to adapt to new situations or try paths that deviate from their learned behaviors. For example, purely learned systems or neural networks may be overly rigid and may cause a vehicle to move to a less ideal location and/or may not prepare the vehicle to be in a preferred position. To address these and other problems and to ensure a robust framework, a planning system can include a reinforcement learning structure combined with a variably weighted search mechanism for trajectory planning. In this way, the planning system shares the task of autonomous vehicle driving across disparate techniques to achieve a fast and creative output. As such, disclosure herein relates to the improvement of a vehicle's ability to autonomously navigate across various paths.

In some cases, creatively exploring actions and states can be time intensive and a vehicle may have time and/or compute constraints that limit its ability to explore all actions. To address these issues, the system can limit certain actions/states to be explored. In some cases, the system can omit or ignore the exploration of actions that are likely to result in less desirable outcomes (e.g., states that would break certain rules like colliding with a pedestrian or leaving a driving surface, actions or states that do not satisfy comfort or safety thresholds, etc.). In certain cases, the system can limit certain actions or states at an early point in the exploration process and/or using a neural network to identify less desirable actions/states. By limiting the actions to explore (at an earlier time and/or by using a neural network), the planning system can relatively quickly eliminate less desirable actions and states and expend greater time and compute resources exploring actions that it may otherwise not have time or compute resources to explore. This can result in a faster yet still creative exploration of the scene.

Figure 5:
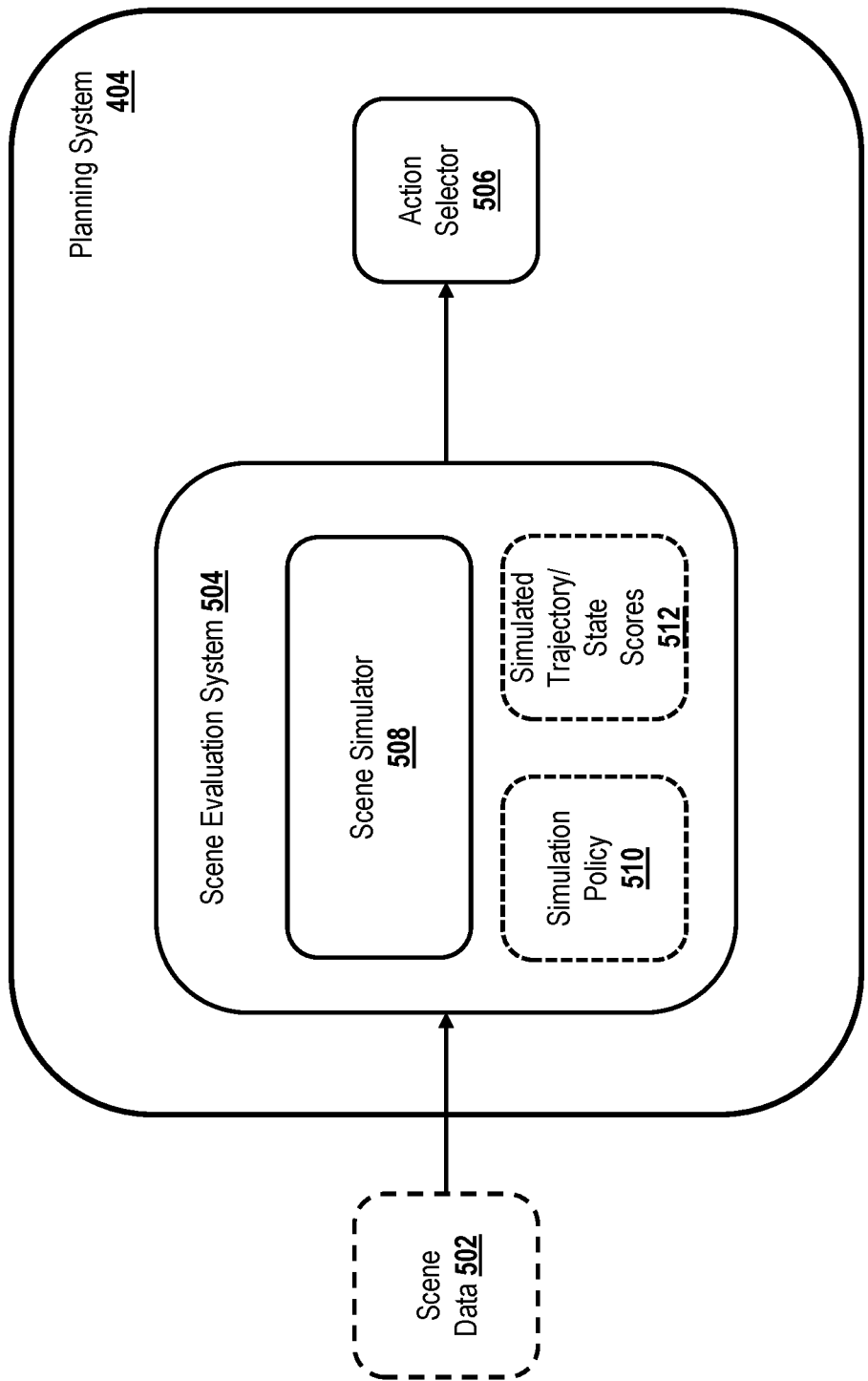
FIG. 5 is a block diagram illustrating an example planning system of an autonomous system.

FIG. 5 is a block diagram illustrating an example planning system 404 that uses scene data 502 associated with a scene of a vehicle to plan a path for, and control, a vehicle 200. The scene data 502 can include data related to the vehicle 200 and/or other objects within the scene of the vehicle 200 (also referred to herein as a vehicle scene), such as objects around the vehicle 200 (non-limiting example: objects identified by the perception system 402). As described herein, the objects may include, but are not limited to pedestrians, bicycles, other vehicles, signs, curbs, buildings, etc. As a non-limiting example, the scene data 502 can include data associated with the position, orientation, velocity, acceleration, or other information of the vehicle and/or the objects in the scene (also be referred to herein as scene state data or state data).

The state data associated with the vehicle 200 may be obtained from a sensor suite associated with the perception system 402, sensor data from the localization system 406, and/or one or more sensors in or around the vehicle that are specific to the vehicle (e.g., sensors used to obtain data about the vehicle that is not obtained about other objects in the vehicle scene). Accordingly, the state data associated with the vehicle 200 may be obtained differently (e.g., location data of the vehicle 200 may be obtained from the localization system 406, whereas location data of an object may be obtained from the perception system 402) and/or include additional data that is not available for other objects in the vehicle scene. For example, the state data associated with the vehicle 200 (or vehicle state data) can include, but is not limited to, steering wheel alignment data associated with an alignment or rotation of the steering wheel of the vehicle, accelerator data associated with an amount (or percentage) by which an accelerator (e.g., gas or throttle pedal) has been depressed or activated, decelerator data associated with an amount (or percentage) by which a decelerator (e.g., brake) has been depressed or activated, other controls of the vehicle (e.g., blinker data associated with one or more blinkers of the vehicle, light data associated with one or more lights of the vehicle) or other data associated with the vehicle (e.g., engine data associated with the engine of the vehicle, such as RPMs, etc.), etc.

The state data associated with the objects (individually or collectively referred to as object state data) in the scene can be obtained from the perception system 402 (or other source) and be based on data obtained from a sensor suite that includes one or more devices such as cameras 202*a*, LiDAR sensors 202*b*, radar sensors 202*c*, and microphones 202*d*, or communications with the objects (e.g., wireless communications with other vehicles), etc. As described herein, the object state data can include any one or any combination of, acceleration, velocity, position (relative to vehicle 200 or absolute/geographic), orientation/heading, classification, or size, etc., of the objects.

In the illustrated example, the planning system 404 includes a scene evaluation system 504 and an action selector 506, however, it will be understood that the planning system 404 can include fewer or more components. In some embodiments, any and/or all of the components of the scene evaluation system 504 (including the scene simulator 508) and/or action selector 506 can be implemented using one or more processors or computer hardware (e.g., by microprocessors, microcontrollers, application-specific integrated circuits [ASICs], Field Programmable Gate Arrays (FPGAs), and/or the like). Such processors or computer hardware can be configured to execute computer-executable instructions stored on non-transitory storage media to perform one or more functions described herein.

The scene evaluation system 504 can use the scene data 502 to determine a scene state (e.g., state of the vehicle and objects within the scene) and generate and evaluate simulated scene states and/or simulated trajectories for the vehicle 200, and the action selector 506 can select an action associated with one or more of the simulated states or simulated trajectories (e.g., an action that can change the scene state to a state that is, or more closely, resembles a simulated state). Based on the selected action, the control system 408 can control the vehicle along a trajectory or path of a route. For example, the control system 408 can cause the vehicle to maintain or adjust one or more parameters to execute the selected action In the illustrated example, the scene evaluation system 504 includes a scene simulator 508, simulation policy 510, and simulated trajectory/state scores 512. The scene simulator 508 can use the simulation policy 510 to simulate potential scene states and/or potential trajectories based on the scene state and be implemented using one or more processors or other computer hardware, one or more neural networks, etc. The simulation policy 510 and scores 512 can be stored in one or more data stores associated with the scene evaluation system 504, planning system 404, or vehicle 200. The data stores may be located on the vehicle 200 or remote from the vehicle 200.

The simulation policy (or policies) 510 can include one or more policies to indicate which vehicle actions to simulate (e.g., vehicle action policy), which simulated states to generate, explore, and expand (e.g., state selection policy), how to simulate the vehicle during a trajectory simulation (e.g., vehicle simulation policy), how to simulate objects in the scene during a trajectory simulation (e.g., object simulation policy), when to end a trajectory simulation (e.g., end state policy), how to evaluate a trajectory simulation (e.g., trajectory evaluation policy), and/or when to end the state/trajectory simulations (e.g., simulation termination policy). Accordingly, the scene evaluation system 504 can use the simulation policy 510 to evaluate the simulated trajectories and simulated scene states and determine the scores 512 for the simulated trajectories and simulated states. Although reference herein may be made to one or more policies or sub-policies of the simulation policy 510, it will be understood that the policies individually or in the aggregate can be referred to as the simulation policy 510.

The scene simulator 508 can use the scene data or scene state to determine a simulated scene state based on a proposed or potential action by the vehicle 200. For example, the scene simulator 508 can simulate a scene or scene state if the vehicle 200 were to turn fifteen degrees to the left or accelerate by 25% for 500 ms. The scene simulator 508 can also determine a simulated scene state based on a potential action by one or more objects in the scene. For example, the scene simulator 508 can determine the simulated scene state if one or more pedestrians or other vehicles were to continue on their path for a period of time, or change their path, such as by turning left or right, accelerating/decelerating by 50%, or moving in reverse. The scene simulator 508 can also simulate a trajectory for the vehicle 200 based on the scene state or simulated scene state and one or more potential actions by the vehicle 200.

The action selector 506 can select an action to be taken by the vehicle 200 based on the results of the scene evaluation system. In some cases, the action selector 506 can select the action based on a vehicle planning policy. The vehicle planning policy can indicate how the action selector 506 is to evaluate the results for the scene evaluation system. In some cases, the evaluation of the results can include a review of the scores associated with one or more simulated states or simulated trajectories. In certain cases, the evaluation can include a review of the scores of simulated states that result from an action taken from the scene state (also referred to herein as child states or first-level simulated states). In some such cases, the action selector 506 can select an action that corresponds to one of the first-level simulated states. In certain cases, the action selector 506 can select that action that corresponds to the first-level simulated state with the highest score, highest aggregate score, highest average score, highest single score, or for which the most trajectories have been simulated, etc.

It will be understood that the action selector 506 can select an action based on any number of criteria. In some cases, the action selector 506 can select an action based on a safety or comfort score. The safety and/or comfort score can be based on one or more safety threshold and/or comfort thresholds (similar to those described herein with reference to the vehicle action policy). In some such cases, the action selector 506 can select an action that is determined to be the safest or most comfortable and/or use these features to select an action from a number of similarly scored actions/simulated states.

The selected action can be used by the control system 408 to maintain or modify one or more controls of the vehicle 200 in order to execute the action. For simplicity, certain functions of the scene evaluation system 504 and action selector are described herein with reference to the example provided in FIGS. 6A-6G.

Scene Simulation Example

FIGS. 6A-6G are state diagrams illustrating an example of the scene evaluation system 504 generating and scoring simulated states and trajectories from a scene state. In some cases, the scene evaluation system 504 can use a randomized-weighted search mechanism, such as a Monte Carlo Tree Search (MCTS) to evaluate simulated trajectories and simulated states by selecting a simulated state derived from a scene state, expanding the selected simulated state, simulating a trajectory for the simulated state, and propagating the results or score of the simulated trajectory to the simulated state and its parent states (e.g., simulated states between the simulated state and the scene state).

Figure 6A:
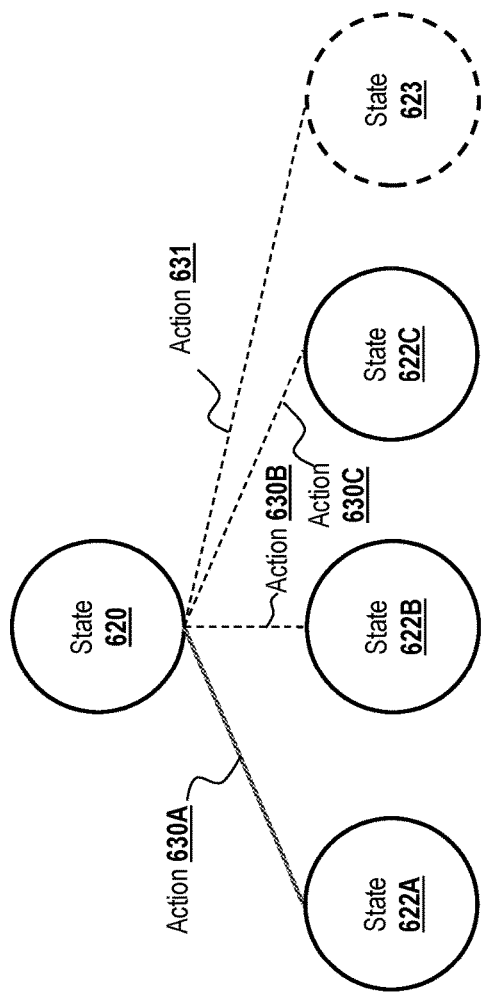
FIGS. 6A-6G are state diagrams illustrating an example of the scene evaluation system generating and scoring simulated states and trajectories from a scene state.

FIG. 6A is a tree diagram illustrating a scene state 620 for a scene of a vehicle 200, different simulated scene states 622A, 622B, 622C (individually or collectively referred to as simulated states 622 or simulated scene states 622) generated or derived from the scene state 620, and an unselected scene state 623. In the illustrated example, nodes of the tree diagram can represent a scene state 620, simulated scene state 622, or unselected scene state 623, and each edge represents an action, potential action, or simulated action that can be taken by the vehicle 200. In the illustrated example, the tree diagram includes a scene state 620, three simulated states 622 (also referred to as child states or first-level simulated states as they are one level from the scene state 620), three actions 630A, 630B, 630C (individually or collectively referred to as actions 630) that can be taken by the vehicle 200 to arrive at the different simulated states 622A, 622B, 622C, respectively, one unselected scene state 623, and one unselected action 631.

The scene state 620 can represent a scene state of a scene of a vehicle 200. As described herein, the scene state 620 can include the vehicle state and the state of the objects in the scene (e.g., pedestrians, vehicles, buildings, etc.).

The actions 630 (or simulated actions) and unselected action 631 can correspond to one or more controls that can cause the vehicle 200 to act in a certain way. For example, the actions 630, 631 can include, but are not limited to, accelerating (by a preset or variable amount), decelerating (by a preset or variable amount), turning or veering left or right (by a preset or variable amount), changing lanes, maintaining velocity or direction, moving in reverse, changing lanes, etc. Moreover, the actions 630, 631 can be associated with time. For example, the actions 630, 631 can correspond to certain controls taken during a particular time, such as veering right for 500 ms.

In certain cases, an action 630, 631 can include a combination of controls that cause the vehicle 200 to act in a particular way. For example, an action 630, 631 can include decelerating and veering left or accelerating and veering right, or changing lanes, etc. Accordingly, it will be understood that although three (selected) actions 630A, 630B, 630C and three corresponding simulated states 622A, 622B, 622C are illustrated in FIG. 6A, fewer, more, or different actions 630 or simulated states (at different levels) can be determined or are available. For example, unselected action 631 can represent an action that is not selected for simulation and state 623 can represent an unsimulated state (e.g., based on the action 631 not being selected/simulated).

In some cases, an action 631 and/or state 623 may not be selected for simulation based on a determination that the action 631 and/or state 623 does not satisfy a safety and/or comfort threshold. For example, a score associated with the action 631 and/or state 623 may not satisfy a safety, comfort, or preference score threshold. In certain cases, an action 631 and/or state 623 may not be selected for simulation based on a prioritization. For example, based on a score of the action 631 and/or state 623, it may have a lower priority than other actions and states. Based on its prioritization, the system may not have sufficient time to simulate the action 631 and/or state 623 given time and/or compute resource constraints.

In some cases, the scene evaluation system 504 identifies the actions 630 (and correspondingly the states 622) based on a vehicle action policy. The vehicle action policy can indicate how to determine the actions that may be available for simulation. In certain cases, the vehicle action policy can indicate that all actions that are physically possible are to be considered available (e.g., regardless of the scene state or scene data). In certain cases, the vehicle action policy can indicate that the available actions are to be selected based on the scene data or scene state, safety thresholds, comfort thresholds, etc. (e.g., that not all physically possible actions are to be considered available for the vehicle).

In some cases, actions (e.g., action 631) and corresponding states (e.g., state 623) can be omitted from potential simulation if they are not physically possible (e.g., the vehicle is not physically capable of increasing its acceleration and/or increasing its turning angle at that point in time) and/or would violate a safety threshold, comfort threshold, or other criteria. For example, if the planning system 404 includes a safety threshold of not moving onto a sidewalk and the scene state indicates that a sidewalk is immediately to the right of the vehicle 200, the vehicle action policy can indicate that turning right is not to be considered an available action and can omit it from the simulation. Similarly, the vehicle action policy can use other thresholds for the safety threshold to determine which actions are available for the simulations, such as, but not limited to, an acceleration or deceleration threshold, location of objects relative to the vehicle 200, edge of the road, combination of turn angle and speed (e.g., turn angle and speed that could result in the loss of control of the vehicle 200 or the vehicle 200 rolling), etc.

As another example, if the planning system 404 implements a comfort threshold as a centrifugal force threshold, the vehicle action policy can indicate that actions that result in a centrifugal force that satisfies (or exceeds) the centrifugal force threshold are not to be considered for the simulations. Similarly, as described the vehicle action policy can use other thresholds for the comfort threshold, such as an acceleration or deceleration threshold, turning angle threshold, etc.

In certain cases, the vehicle action policy can indicate that the available actions are to be determined or obtained from a trained neural network. The trained neural network can use learned features from past driving data to determine actions that do not satisfy a safety and/or comfort threshold, or other criteria, and omit those actions from the available actions 630 for simulation. In this way, the system can avoid using time and compute resources to explore actions and/or states that are unlikely to result in a viable path. This can increase the time and compute resources available to explore viable paths, thereby increasing number of viable actions/states explored and the confidence in the selected path, as well as increasing the speed by which the system analyzes viable actions and states in determining which action to take.

Moreover, by limiting the actions to be explored at an early point in time of the process (e.g., using a neural network) the planning system 404 can expend greater time and compute resources exploring actions, states, and trajectories that are more likely to result in positive outcomes for the vehicle (e.g., safer outcomes that reduce the likelihood of a collision, more comfortable outcomes that are more likely to satisfy comfort thresholds, etc.). Limiting the actions to explore at an earlier time can further enable the planning system to more creatively explore actions that may otherwise be ignored because they do not at first pass appear to be better than other actions. This can result in a more creative exploration of the scene while quickly eliminating bad actions. With the potential actions 630 and simulated scenes 622 determined, the scene evaluation system 504 can use a state selection policy to select which of the simulated states 622 to explore. The state selection policy can indicate states are to be explored randomly and/or based on one or more criteria, such as, but not limited to, the number of times a simulated state 622 has been explored or ignored (e.g., number of simulations generated from the simulated state 622), scores for the simulated states 622 (e.g., highest aggregate score, highest average score, etc.), rankings of actions associated with the simulated states, and/or scores for the simulated trajectories associated with the different simulated states, etc.

In some cases, the state selection policy can favor the exploration of states that have a higher score and/or states that have not been explored recently (e.g., states that have not been explored after a threshold number of simulated trajectories, states have ben been explored fewer than a threshold number relative to one or more other simulates states, etc.). In certain cases, the state selection policy can weight the score, number of times a state has been explored or ignored to select the state. In some cases, the weight can favor the selection of states that have not explored many times relative to other states. As described herein, in some cases, the state selection policy can use an MCTS policy or other heuristic search policy or algorithm to determine which states to explore. By exploring states that have not been explored recently or less frequently searched states, the scene evaluation system 504 can improve the flexibility of the potential trajectories. In the illustrated example, based on the state selection policy, the scene evaluation system 504 selects simulated state 622A for exploration.

The rankings of actions can be based on safety, comfort or a preference for maintaining the status quo (e.g., no modifications to heading, velocity, etc.). In certain cases, the ranking may come from a neural network trained to rank common actions or frequently used actions.

Figure 6B:
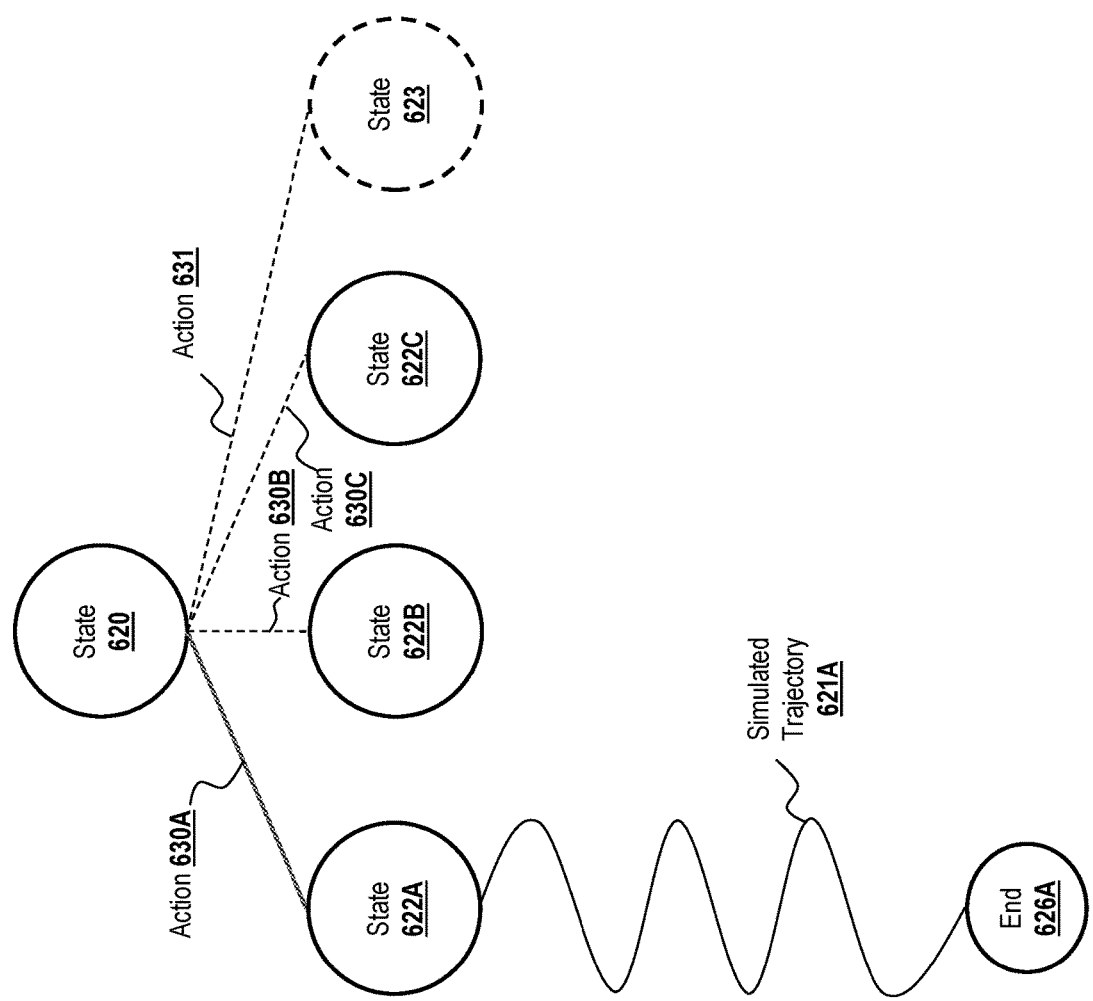

FIG. 6B is a tree diagram illustrating the selection of simulated state 622A for exploration and a simulation of a trajectory 621A (also referred to herein as a simulated trajectory 621A, trajectory simulation 621A or path simulation 621A) associated with the simulated state 622A. In the illustrated example, the simulated trajectory 621A is initiated from the simulated state 622A to an end state 626A. During the trajectory simulation 621A, the scene evaluation system 504 can select actions for the vehicle 200 and/or the objects to take until the end state 626A is achieved. In some cases, the selections of the actions by the vehicle 200 and/or the objects can be based on a vehicle simulation policy and/or object simulation policy, respectively. The vehicle simulation policy can indicate how to select actions for the vehicle 200 and the object simulation policy can indicate how to select actions for the objects in the vehicle scene.

It will be understood that the vehicle actions and object actions can occur simultaneously and/or concurrently rather than sequentially. For example, the action of the vehicle can be simulated as occurring at the same time as one or more actions by the objects in the scene. As such, the vehicle 200 can continue to take actions as the objects are also taking actions (i.e., without waiting for the objects to take an action).

The actions can include any one or any combination of the aforementioned actions (e.g., adjusting the vehicle 200 direction or speed, maintaining direction/speed, etc.) as described herein with reference to at least the vehicle action policy. In some cases, the simulated actions may be taken at set or varying time intervals. For example, the scene evaluation system 504 can simulate actions being taken by the vehicle 200 every 100 ms, 200 ms, 500 ms, one second, or more. In some such cases the simulated states 622 can refer to the same time in the future relative to the scene state 620.

In some cases, the scene evaluation system 504 can select the simulated actions for the vehicle and objects randomly or pseudo-randomly from all of the possible (or available) actions as indicated by the vehicle simulation policy and object simulation policy, respectively. In certain cases, the scene evaluation system 504 can select the simulated actions randomly or pseudo-randomly from a subset of the total available actions. In certain cases, the actions that are not available during the simulation may be based on safety factors or thresholds or comfort thresholds. For example, if the vehicle 200 is moving forward, an action that would cause the vehicle 200 to attempt to move in reverse may not be used during the simulation or turning the wheel more than a threshold number of degrees in either direction may not be used during the simulation. In certain cases, the scene evaluation system 504 can use a trained neural network to reduce the number of actions that are available for simulation during the trajectory simulation 621A.

In addition to simulating actions for the vehicle 200 to take, the scene evaluation system 504 can simulate actions by the multiple objects in the vehicle scene as indicated by the object simulation policy. This can include the actions taken by multiple objects of different classifications (e.g., pedestrians, bicycles, other vehicles, etc.). In certain cases, the scene evaluation system 504 can use the simulated actions of the objects and/or simulated paths or trajectories of the objects to select actions for the vehicle 200. For example, the simulation policy can indicate to the scene evaluation system 504 that simulated actions by the vehicle 200 are to avoid a collision with an object (e.g., based on the objects predicted trajectory).

In some cases, the scene evaluation system 504 can use a current path/trajectory of the objects to determine the objects actions (or path/trajectory) as indicated by the object simulation policy. For example, the scene evaluation system 504 can determine that the objects in the vehicle scene will continue on their path without change (e.g., no change in direction, velocity, etc.) and may not react to actions by the vehicle 200.

In certain cases, the scene evaluation system 504 can vary the path/trajectory of the objects during the simulation as indicated by the object simulation policy. In some such cases, the scene evaluation system can select actions (by the objects) that correspond to an object responding to the actions of the vehicle 200. For example, the scene evaluation system 504 can determine that the objects will react to the vehicle's actions, such as a pedestrian slowing down or speeding up in a crosswalk if the vehicle 200 accelerates, or another vehicle decelerating if the vehicle 200 decelerates, etc.

In some cases, the scene evaluation system 504 can simulate the actions of the objects in the vehicle scene based on their classification or type as indicated by the object simulation policy. For example, the scene evaluation system 504 can simulate the actions of a pedestrian different from the actions of a vehicle or bicycle. As a non-limiting example, the object simulation policy can assign a higher probability that a pedestrian will change direction or stop as compared to a vehicle or bicycle. In some cases, a pedestrian may have a "stop" action within a particular time period (e.g., 500 ms), whereas a vehicle may not (e.g., it may not be able to stop within that particular time period given its current velocity).

In simulating actions for the different objects, the scene evaluation system 504 can treat each object as an independent actor (e.g., each object may act independent of the other objects in the scene) as indicated by the object simulation policy and/or simulation policy. For example, the scene evaluation system 504 may estimate that different pedestrians will act differently based on their size (e.g., child may act differently than adult, such as by being more likely to accelerate or change direction in a short time period (e.g., <1 sec.)), location (e.g., the actions of pedestrians on a crosswalk may be dependent on the vehicle's actions (e.g., pedestrian is likely to speed up/slow down depending on what the vehicle 200 does), whereas the actions of pedestrians on a sidewalk may be independent of the vehicle's actions), speed (e.g., pedestrians running may be less likely to stop/move in the opposite direction (or otherwise make a significant change in direction (e.g., >60 degrees) within a particular time period (e.g., <500 ms) than pedestrians that are walking). Similarly, the scene evaluation system can take into account the features of other vehicles (e.g., size, position relative to vehicle 200, velocity, etc.) or bicycles (e.g., size, position relative to vehicle 200, velocity, etc.) in simulating their actions. For example, the scene evaluation system 504 may treat vehicles traveling in the same direction and in front of the vehicle 200 as acting independent of the vehicle's actions but may treat vehicles traveling in the same direction and behind (or to the side) as taking actions dependent on the vehicle's actions.

In certain cases, the scene evaluation system 504 can use a trained neural network to estimate or select the actions of the objects in the vehicle scene as indicated by the object simulation policy. The trained neural network may use different classifications of objects to simulate the actions the objects may take. For example, the trained neural network can select an action for vehicles based on learned characteristics of vehicles. Similarly, the trained neural network can select an action for bicycles and/or pedestrians based on learned characteristics of the bicycles and pedestrians.

The scene evaluation system 504 can continue simulating the trajectory 621A by selecting actions for the vehicle 200 and the objects in the vehicle scene as indicated by the simulation policy until the end state 626A is reached. In some cases, an end state policy can be used to determine when the end state 626A is reached. The end state policy can take into account any one or any combination of threshold simulated time period, threshold simulated number of actions, threshold simulated distance, or landmark reached or passed to determine when the end state 626A will occur. For example, the end state policy can indicate that the scene evaluation system 504 is to simulate actions for the vehicle 200 and the objects in the vehicle scene until six seconds of travel time (or some other threshold time period) has been simulated. As another example, the end state policy can indicate that the scene evaluation system 504 is to simulate actions for the vehicle 200 and the objects in the vehicle scene until one hundred actions (or some other threshold number of actions) have been simulated. In certain cases, the end state policy can indicate that the scene evaluation system 504 is to simulate actions for the vehicle 200 and the objects in the vehicle scene until a threshold distance has been simulated or a landmark reached. For example, the scene evaluation system 504 can select actions for the vehicle 200 and objects in the vehicle scene until ¼ mile (or other threshold distance) has been simulated or until an intersection (or another landmark) has been passed. As such, the end state 626A may be reached even though additional actions and/or states could be simulated (e.g., the simulations could continue). For example, the end state 626A may not represent the end of a route or the termination of driving, rather the end state 626A can represent a point (in time, location, distance, etc.) at which the simulated trajectory is to end.

Once the end state 626A is reached, the simulated trajectory 621A can be evaluated based on a trajectory evaluation policy. The trajectory evaluation policy can indicate the criteria by which the simulated trajectory 621A is to be evaluated.

In some cases, the trajectory evaluation policy can indicate that one or more features of the simulated trajectory 621A are to be used to evaluate the simulated trajectory 621A. The features can be predefined, dynamically determined, or learned, such as, by using a neural network. The features can relate to vehicle safety (e.g., likelihood of collision, leaving road, etc.), passenger comfort (acceleration/deceleration, centrifugal force, degree of turn, etc.), efficiency (distance from center of route, lane change, etc.), and can include any one or any combination of collision (or likelihood of), amount or rate of acceleration, amount or rate of deceleration, distance to goal, distance to traffic signal (e.g., stop sign, light, etc.), lateral acceleration/deceleration, alignment or heading, change in alignment or heading, velocity, change in velocity, off road (e.g., leaving road), lane change, distance from route, drivability, centrifugal force, etc. It will be understood that fewer, more, or additional features can be used to evaluate the simulated trajectory 621A.

In certain cases, the trajectory evaluation policy can indicate how the different features are to be used to evaluate the simulated trajectory 621A. In certain cases, the trajectory evaluation policy can indicate one or more thresholds for the different features. For example, the trajectory evaluation policy can indicate that the simulated trajectory 621A is considered a success if one or more features of the simulated trajectory 621A satisfy corresponding feature thresholds.

The thresholds can vary for the different features. For example, the threshold for a feature related to colliding with an object, a determination that the trajectory would (or would likely, e.g., >50%) result in a collision with an object would cause the scene evaluation system 504 to classify the trajectory as unsuccessful (or give it a low or failing score). As another example, the threshold for veering left or right may be based on the velocity of the vehicle 200. For example, a relatively larger degree turn threshold may be used at lower velocities and relatively smaller degree turn threshold may be used at higher velocities given that the centrifugal forces at the lower velocity will be lower. Accordingly, in certain cases, the scene evaluation system 504 can compare an estimated centrifugal force along a trajectory with a threshold centrifugal force to evaluate the simulated trajectory 621A.

In certain cases, the trajectory evaluation policy can indicate how to combine the one or more features to evaluate the simulated trajectory 621A. For example, the trajectory evaluation policy can indicate different weights for the different features to indicate how the features are to be weighted respective to each other and/or how to determine an overall score for the simulated trajectory 621A.

In some cases, the trajectory evaluation policy can indicate that simulated trajectories are to be compared with a preset trajectory or a route. The preset trajectory may correspond to a trajectory identified as being a trusted trajectory (e.g., an expert trajectory). The route can correspond to a planned route of the vehicle 200 from its starting point to its end point. In some such cases, the scene evaluation system 504 can score the simulated trajectory higher or lower depending on its similarity to the preset trajectory or route. The similarities can take into account proximity to the preset trajectory or route as well as other features, such as, but not limited to, velocity, acceleration, etc.

In certain cases, the trajectory evaluation policy can indicate that trajectories are to be evaluated based on safety and/or comfort thresholds (similar to those described herein with reference to the vehicle action policy). Accordingly, trajectories with a higher safety and/or comfort score can receive a higher score and/or be more likely to be identified as being successful.

As described herein, the scene evaluation system 504 can evaluate the trajectory based on the individual features of the simulated trajectory 621A and/or a combination of features. The scene evaluation system 504 can assign a score to the simulated trajectory 621A and/or determine whether the simulated trajectory 621A is a "success" or "failure" (e.g., whether some or all features satisfy their respective thresholds and/or whether a combined score satisfies a score threshold).

Figure 6C:
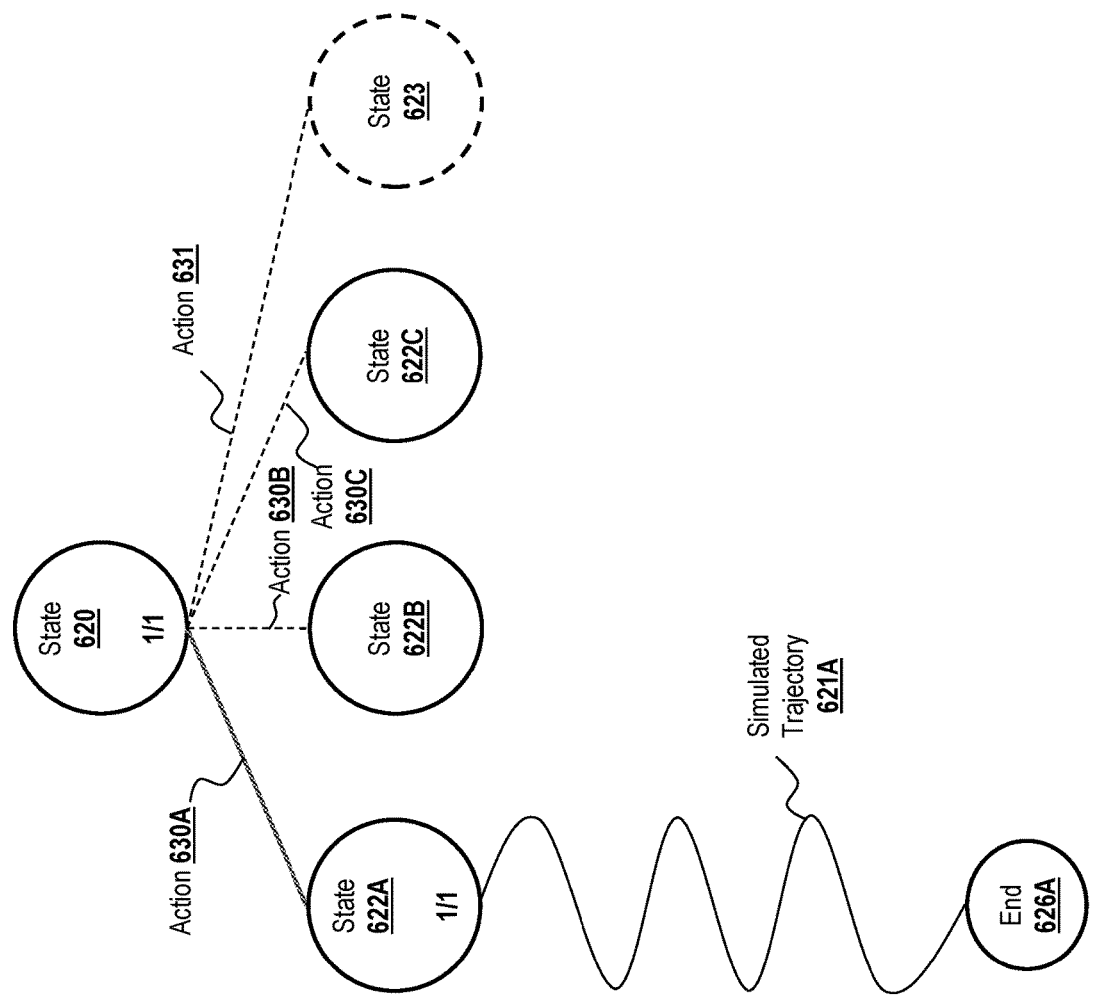

FIG. 6C is a tree diagram illustrating the propagation of the results of the evaluation of the simulated trajectory 621A (or score) to the simulated state 622A and the scene state 620. In the illustrated example, the simulated trajectory 621A is determined to be a success (e.g., simulated trajectory 621A determined to be a success based on the trajectory evaluation policy). As such, the node corresponding to the simulated state 622A is updated to indicate that one simulation has been made and it was a success. The results/score is similarly propagated to the scene state 620.

For simplicity, in the illustrated example, the scores are reflected as number of successes over number of simulations, however, it will be understood that different scores for simulated trajectories can be used in place of success/number of simulations. For example, each state can include a total score (e.g., sum of scores from all simulations) and number of simulations or an average score, etc. In some such cases, these scores can be used to determine which state should be explored according to the state selection policy.

Figure 6D:
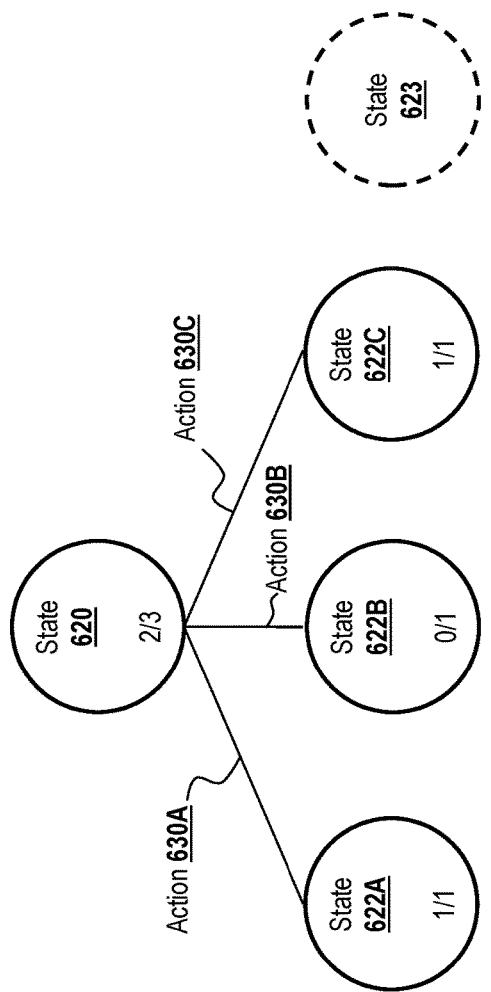

FIG. 6D is a tree diagram illustrating the scores for the different simulated states 622A-622C after one trajectory has been simulated from each simulated state 622A-622C. In the illustrated example, the results indicate that a simulated trajectory from simulated state 622B was unsuccessful, and a simulated trajectory from the simulated state 622C was successful according to the trajectory evaluation policy. Based on the results of the trajectory simulations, the score of the scene state 620 has been updated to reflect that two of three simulations were successful according to the trajectory evaluation policy.

Figure 6E:
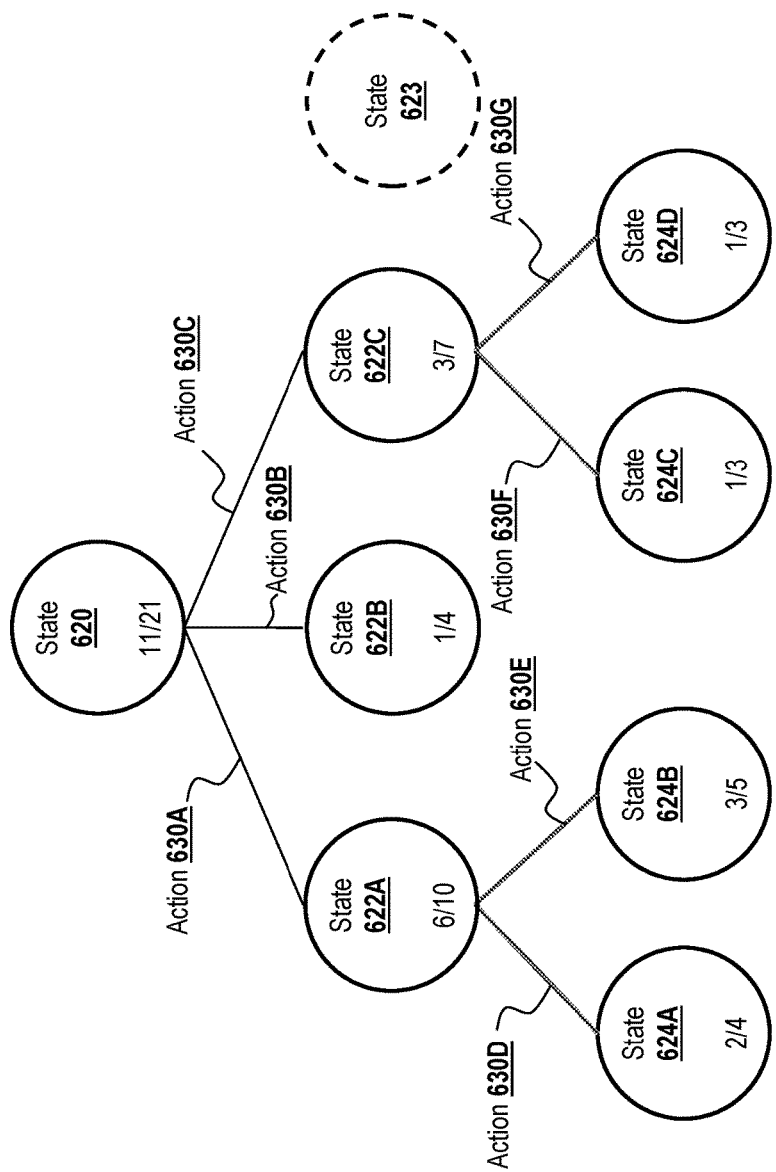

FIG. 6E is a tree diagram illustrating the scores for the scene state 620, (first-level) simulated states 622A, 622B, 622C, and (second-level) simulated states 624A, 624B, 624C, 624D (also referred to as grandchild states or second-level simulated states given they are two levels from the scene state 620), after the scene evaluation system 504 has simulated and evaluated 21 trajectories; eleven of which were successful according to the trajectory evaluation policy. FIG. 6E further illustrates the actions 630A, 630B, 630C, 630D, 630E, 630F, and 630G that correspond to the simulated states 622A, 622B, 622C, 624A, 624B, 624C, 624D, respectively (e.g., the actions that lead to or result in the respective simulated state).

As described herein, in some cases, simulated states at different levels can correspond to different times. For example, the scene state 620 can correspond to the state of the scene at time $t_0$, the first-level simulated states 622 can correspond to simulations of the scene at time $t_1$, and the second-level simulated states 624 can correspond to simulations of the scene at time $t_2$. However, it will be understood that in some cases simulated states in the same level may correspond to different times. In some such cases the different times may correspond to the action taken to arrive at the simulated state. For example, if action 630A is maintain heading and velocity and action 630C is change lane, the time associated with changing a lane may be greater than the time attributed to maintaining heading and velocity. As such state 622A and state 622C may correspond to different times.

The following table summarizes the number of successful trajectories simulated from a particular state and the total number of trajectories simulated from that state.

TABLE 1

| State | No. of Successful Simulations/Total No. of Simulations |
|---|---|
| 622A | 6/10 |
| 622B | 1/4 |
| 622C | 3/7 |
| 624A | 2/4 |
| 624B | 3/5 |
| 624C | 1/3 |
| 624D | 1/3 |

Based on the state selection policy, the scene evaluation system 504 has simulated and evaluated ten trajectories from state 622A compared to four from state 622B and seven from state 622C. As mentioned, the state selection policy can take into account the scores for the different states, as well as the number of times they have been selected/ignored. Accordingly, although states 622A and 622C have higher scores than state 622B, state 622B can still be selected from time to time for further exploration. In this way, the scene evaluation system 504 can remain flexible in its evaluation of potential trajectories outside of the states that appear most promising (e.g., have a higher score) at an earlier stage of the evaluation.

In the illustrated example, the score is determined based on the number of successful simulations over the total number of simulations from that state, however, it will be understood that different scores can be used. For example, if the scene evaluation system 504 assigns a score to each trajectory (e.g., based on scores for individual features and/or a non-binary combined score that is different from success/failure), the scene evaluation system 504 can use an average score of trajectories from the different states to select which state to explore next.

Figure 6F:
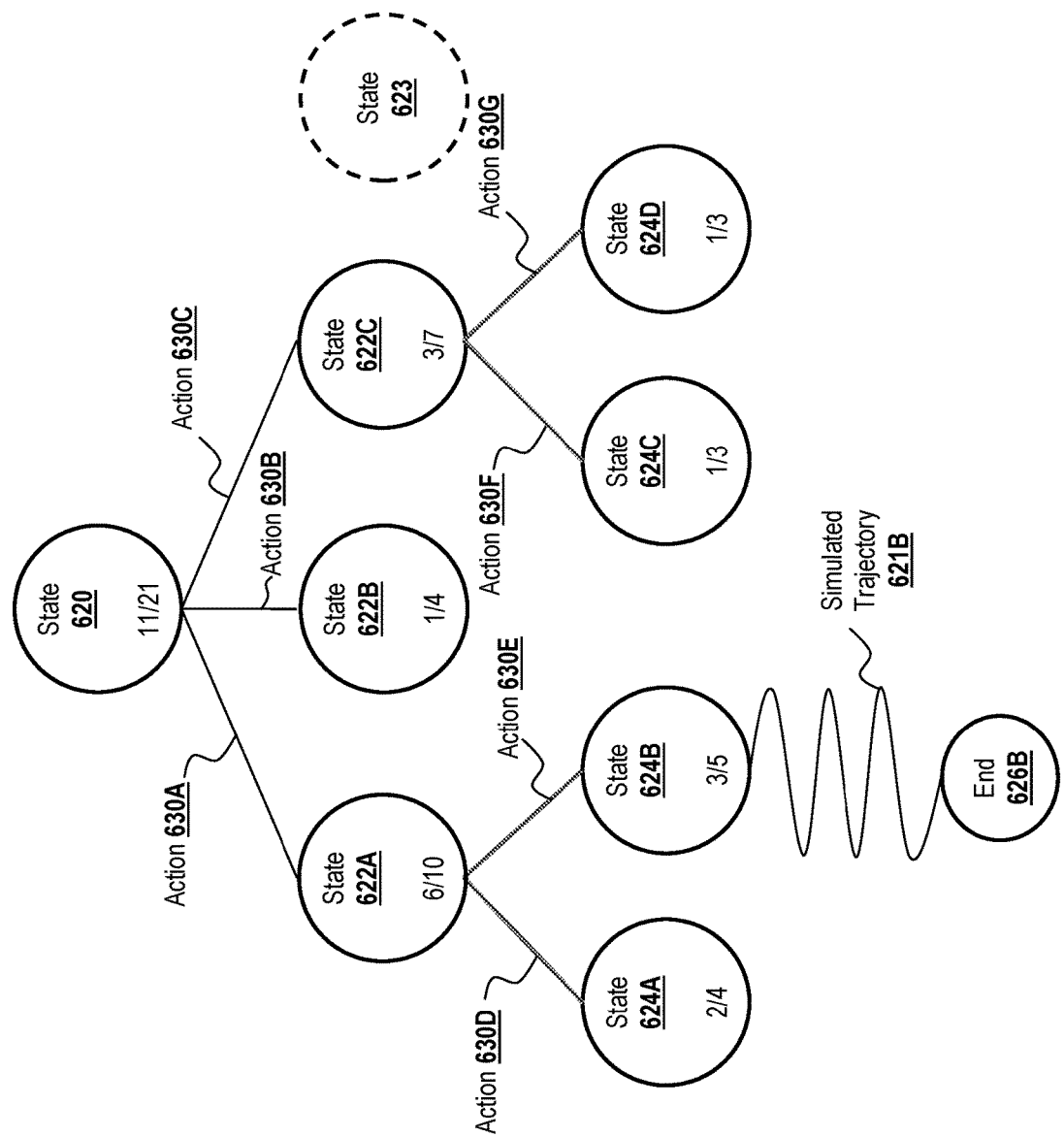

FIG. 6F is a tree diagram illustrating the selection of second-level simulated state 624B for exploration and a simulation of a trajectory 621B from the second-level simulated state 624B to an end state 626B. As described herein, the scene evaluation system 504 can select the second-level simulated state 624B for exploration based on a state selection policy, which can take into account a score for the various states, the number of times the various states have been explored/ignored, randomness, etc. Once selected, the scene evaluation system 504 can simulate the trajectory 621B of the vehicle 200 by simulating actions by the vehicle 200 and/or actions by objects in the vehicle scene according to the simulation policy until the end state 626B is reached according to an end state policy. As described herein the simulated actions by the vehicle 200 and the objects in the vehicle scene can occur simultaneously or concurrently. As such, the actions of the vehicle 200 and the objects may not be turn-based (i.e., take a first action and wait for the another to take an action before taking a second action).

Figure 6G:
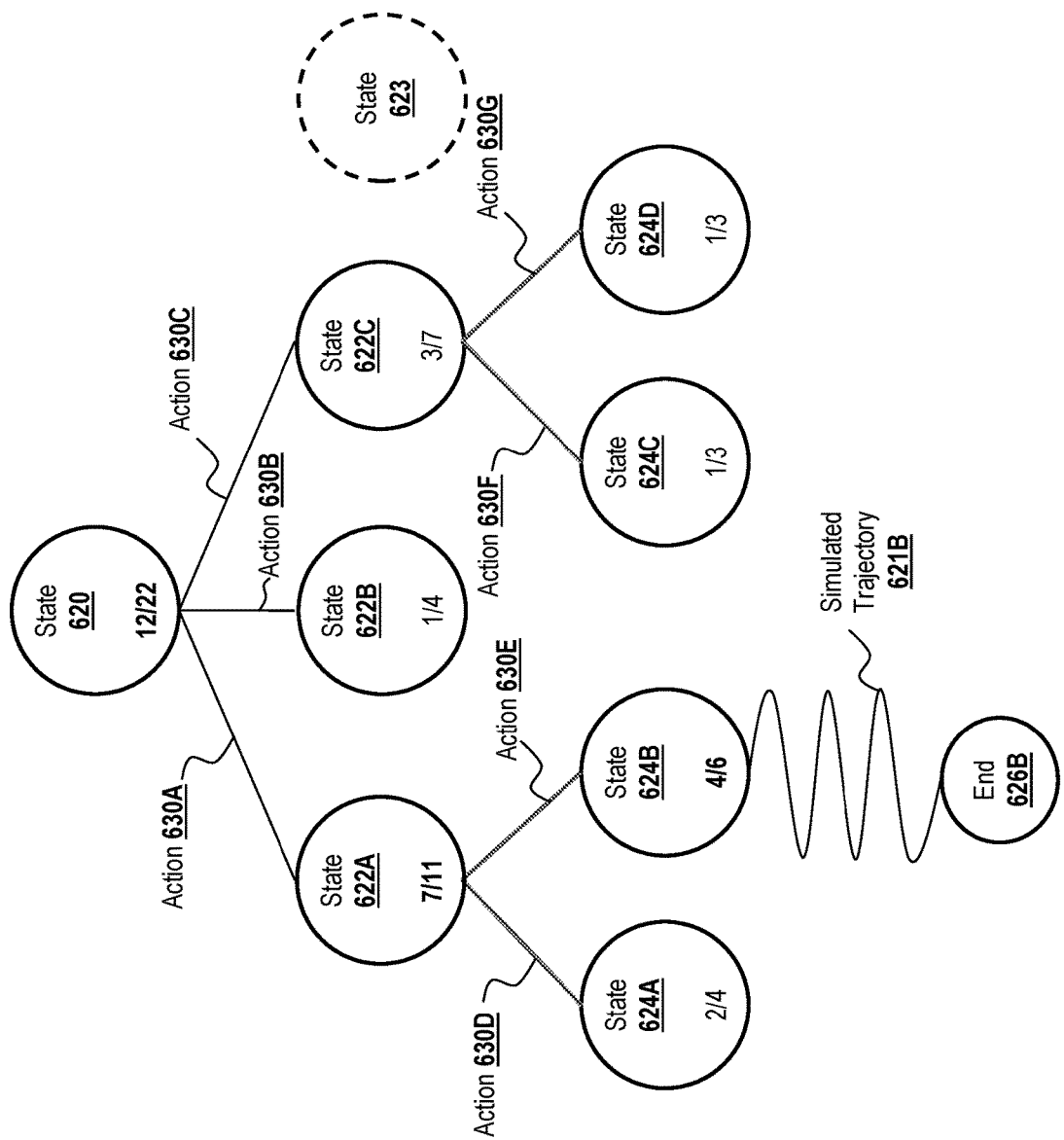

FIG. 6G is a tree diagram illustrating the propagation of the results of the evaluation of the simulated trajectory 621B (or score) to the second-level simulated state 624B and its parent states (e.g., first-level simulated state 622A, and the scene state 620). As described herein, the simulated trajectory 621B can be evaluated and/or scored according to a trajectory evaluation policy. In the illustrated example, the scene evaluation system 504 determines that the simulated trajectory 621B is a success based on the trajectory evaluation policy. As such, the score for the related states is updated. In the illustrated example, the score for the second-level simulated state 624B is updated to 4/6, the score for the first-level simulated state 622A is updated to 7/11, and the score for the scene state 620 is updated to 12/22.

For simplicity, in the illustrated example, the scores are reflected as number of successes over number of simulations, however, it will be understood that different scores for simulated trajectories can be used in place of success/number of simulations. For example, each state can include a total score (e.g., sum of scores from all simulations) and number of simulations or an average score, etc. In some such cases, these scores can be used to determine which state should be explored according to the state selection policy.

Scene evaluation system 504 can continue to select and expand states and evaluate simulated trajectories according to a simulation termination policy. The simulation termination policy can indicate how long the scene evaluation system 504 is to simulate and evaluate trajectories. In some cases, the simulation termination policy can indicate that the scene evaluation system 504 is to simulate trajectories until a threshold time period, threshold number of simulations, threshold number of states, or a threshold amount of processing is reached. For example, the simulation termination policy can indicate that the scene evaluation system 504 is to simulate trajectories for 100 ms, 200 ms, 500 ms, or 1 sec. During this threshold time period, the scene evaluation system 504 can generate and evaluate as many simulations as possible, which may include 1,000 or more trajectory simulations. In certain cases, the simulation termination policy can indicate that the scene evaluation system 504 is to simulate a particular quantity of trajectory simulations. For example, the simulation termination policy can indicate that the scene evaluation system 504 is to generate and evaluate 1,000, 10,000, or 1,000,000 trajectory simulations before terminating the simulations. Similarly, the simulation termination policy can indicate that the scene evaluation system 504 is to explore the various states until a particular number of states have been expanded or a particular number of trajectories have been simulated for one or more of the simulated states. In certain cases, the simulation termination policy can indicate that the scene evaluation system 504 is to use a particular amount or processing power to generate trajectory simulations. Any one or any combination of the aforementioned thresholds, or other thresholds, can be used by the simulation termination policy to indicate how long the scene evaluation system 504 is to simulate and evaluate potential trajectories for the vehicle 200.

Once the particular threshold is reached, the scene evaluation system 504 can terminate the generation and evaluation of additional simulated trajectories, and the action selector 506 can select an action for the vehicle 200 based on a vehicle planning policy. The vehicle planning policy can indicate how the action selector 506 is to evaluate the simulated states and select an action corresponding to one of the states.

In some cases, according to the vehicle planning policy, the action selector 506 can select an action that corresponds to a first-level simulated state 622, such as a first-level simulated state with the highest score, highest average score, most trajectory simulations associated therewith, any combination, thereof, etc. With reference to FIG. 6G, the action selector 506 selects the action 630A, which corresponds to the first-level simulated state 622A with the highest score and most associated simulated trajectories as compared to the other first-level simulated states 622B and 622C. It will be understood that the action selector 506 can use additional or different criteria to select the action (and corresponding simulated state) to take. For example, the action selector 506 may use different criteria to score the simulated trajectories than was done by the scene evaluation system 504 and use its own scores to select an action and/or additional data may cause the action selector 506 to change priorities. For example, the sudden perception that a vehicle in front has braked may cause the action selector 506 to prioritize the braking action above all other actions despite the score or number of simulated trajectories.

As described herein, the action 630A can correspond to any number of actions, such as, but not limited to, turning or veering left or right, maintaining current heading and velocity, accelerating or decelerating, changing lanes, etc. Based on the selected action, the vehicle 200 can be controlled (e.g., by the control system 408) to execute the action.

Once the action 630A is selected by the action selector 506 and/or executed using the control system 408, the scene evaluation system 504 can evaluate the next action for the vehicle 200 as described herein at least with reference to FIGS. 6A-6G. In some such cases, the first-level simulated state 622A that was selected by the action selector 506 becomes (or most closely approximates, as compared to the other simulated states) the scene state 620, and the new scene state 620 is evaluated. In certain cases, the new scene state 620 may be different than the first-level simulated state 622 given that the vehicle 200 is moving. For example, even if all of the objects in the first scene state move according to their predicted paths, some may no longer be identified given the movement of the vehicle 200 and/or additional objects may be identified from new scene data associated with the new scene state 620. As described herein with reference to FIGS. 6A-6G, the trajectory of objects identified in the new scene state 620 can be simulated and used as part of the trajectory simulations for the new scene state 620.

In certain cases, the results of the trajectory simulations from the first-level simulated state 622A are discarded, deleted or not reused after the selected action is taken. For example, the execution of the action may not go as predicted due to variance in the real world or due to different actions by the objects in the vehicle scene. Moreover, the results of the trajectory simulations may not be useful given that the vehicle 200 has itself moved, which may render some visible objects not visible and/or render other objects visible that were previously not visible (e.g., the vehicle 200 will lose "sight" of some objects and gain "sight" of other objects). As such, the simulations evaluated for the first-level simulated state 622A may no longer be reliable or trustworthy after the selected action is taken by the vehicle 200.

In some cases, the simulations from the first-level simulated state 622A (e.g., the results of the eleven simulations referenced in FIG. 6G) are reused after the selected action is taken. In some such cases, the scene evaluation system can expand on the trajectories that it has already evaluated from the first-level simulated state 622A. By reusing trajectory simulations, the scene evaluation system 504 can conserve processing power by not duplicating previous efforts from earlier simulations from the first-level simulated state 622A and/or obtain a greater number of simulations from the new scene state 620 by adding simulations to the previously generated and evaluated simulations done for the first-level simulated state 622A.

In certain cases, the first-level simulated state 622A can be compared with the new scene state 620. If they are the same or satisfy a similarity threshold, the trajectory simulations associated with the first-level simulated state 622A can be used for the new scene state 620. In some cases, the similarity threshold can be based on the number of objects in the first-level simulated state 622A and the new scene state 620 and/or the location of the objects in the first-level simulated state 622A and the new scene state 620. For example, if the number objects in the first-level simulated state 622A satisfy a threshold number relative to the new scene state 620 (e.g., same number of objects or +/−a threshold amount) and/or the objects in the first-level simulated state 622A are within a threshold distance to corresponding objects in the new scene state 620, the system can determine that the similarity threshold is satisfied and use the trajectory simulations associated with the first-level simulated state 622A with the new scene state 620. By reusing simulations, the scene evaluation system 504 can uses it compute resources to explore additional simulated states and generate more simulated trajectories, which can improve the action selection.

Action Selection Flow

Figure 7:
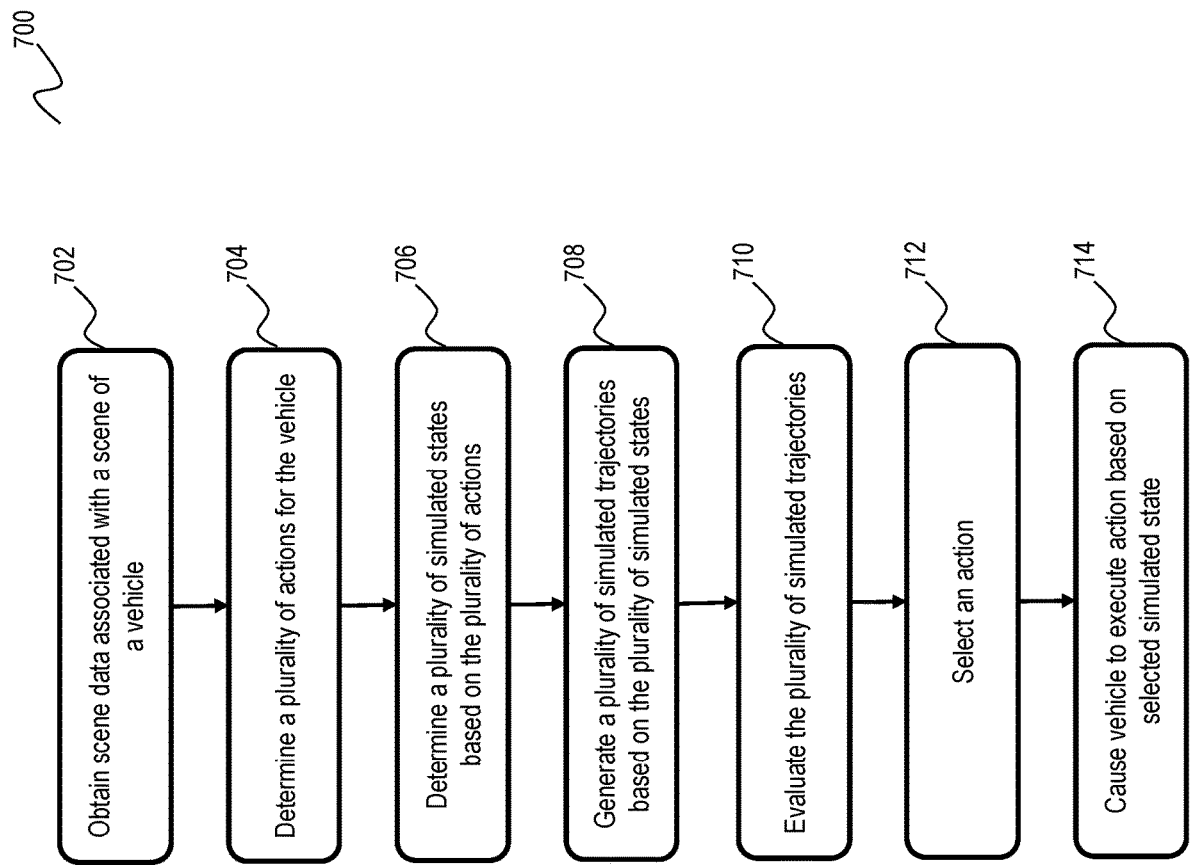
FIG. 7 is a flow diagram illustrating an example of a routine implemented by one or more processors to select an action for a vehicle.

FIG. 7 is a flow diagram illustrating an example of a routine 700 implemented by one or more processors to select an action for a vehicle 200. The flow diagram illustrated in FIG. 7 is provided for illustrative purposes only. It will be understood that one or more of the steps of the routine illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 702, the planning system 404 obtains scene data associated with a scene of a vehicle 200. As described herein, the scene data can include vehicle data associated with the vehicle 200 and/or object data associated with one or more objects in the scene. The data can be generated from one or more sensors from sensor data associated a sensor suite of the with the perception system 402, sensor data from the localization system 406, and/or one or more sensors in or around the vehicle 200 that are specific to the vehicle 200. The scene data can include data related to the position, orientation, heading, velocity, acceleration, of the vehicle 200 or objects in the scene, the amount of acceleration or deceleration of the vehicle 200, steering wheel position of the vehicle 200, etc.

In some cases, the planning system uses the scene data to generate a scene state. The scene state can indicate the position, orientation, heading, velocity, and other determined features of objects in the scene relative to the vehicle 200 and/or to each other. For example, if two vehicles, three pedestrians, a bicycle, and a traffic sign are detected, the scene data can indicate the position, heading, and velocity of these objects relative to the vehicle 200 and/or to each other. As described herein, the planning system 404 can generate or determine the scene state 620 using the scene data.

At block 704, the planning system 404 determines a plurality of actions for the vehicle 200. The actions can correspond to a particular period of time. As described herein, at a or any particular time, the vehicle 200 can take one or more actions, such as, but not limited to, maintaining or modifying the vehicle's heading, velocity, acceleration, lane position, etc. In some cases, an action can include multiple modifications to the control of the vehicle 200, such as, but not limited to, modifying a vehicle's heading and velocity, etc. Accordingly, the planning system can determine the plurality of potential actions for the vehicle 200 at time $t_0$.

The planning system can identify which actions can be taken at a particular time and identify those actions as the plurality of actions according to a vehicle action policy. In certain cases, the planning system 404 can determine that all actions are available (e.g., regardless of the scene state or scene data). In certain cases, the planning system 404 can identify a subset of all options as the plurality of options. In some cases, the planning system can identify the plurality of actions based on any one or any combination of the scene state (or scene data), safety thresholds, comfort thresholds, etc. For example, if the planning system 404 includes a safety threshold of not leaving the road and the planning system 404 determines that the road ends immediately to the right of the vehicle 200, the planning system 404 can determine that turning right is not to be considered as part of the plurality of actions. Similarly, as described herein, other thresholds can be implemented as the safety threshold, such as an acceleration or deceleration threshold, location of objects relative to the vehicle 200, edge of the road, combination of turn angle and speed (e.g., turn angle and speed that could result in the loss of control of the vehicle 200 or the vehicle 200 rolling), etc.

As another example, if the planning system 404 implements a comfort threshold as a centrifugal force threshold, the planning system 404 can determine that actions that result in a centrifugal force that satisfies (or exceeds) the centrifugal force threshold are not to be considered part of the plurality of actions. Similarly, as described herein, other thresholds can be implemented as the comfort threshold, such as an acceleration or deceleration threshold, turning angle threshold, etc.

In certain cases, the planning system 404 can use a trained neural network to determine which actions can be taken for a particular scene state. The trained neural network can use learned features from past driving data to determine actions that do not satisfy a safety and/or comfort threshold. In this way, the system can avoid using time and compute resources to explore actions and/or states that are unlikely to result in a viable path. This can increase the time and compute resources available to explore viable paths, thereby increasing number of viable actions/states explored and the confidence in the selected path, as well as increasing the speed by which the system analyzes viable actions and states in determining which action to take.

At block 706, the planning system 404 determines a plurality of simulated states. As described herein, each vehicle action can change the scene state and result in a simulated state (e.g., the state of the scene if the particular action were taken by the vehicle 200). In certain cases, the simulated state can also take into account predicted actions by objects in the scene. For example, if the scene state is the state of the scene at time $t_0$, a simulated state can be the state of the scene at time $t_1$ if a particular action is taken by the vehicle 200 between time $t_0$ and $t_1$ (and one or more available actions by objects in the scene between time $t_0$ and $t_1$). In some cases, each of the plurality of simulated states assumes the actions by the objects in the scene are the same. In certain cases, the some of the simulated states can use different assumptions about the actions of the objects in the scene to generate the simulated state.

In some cases, one or more distinct simulated states can be determined for each identified action. In certain cases, the simulated states generated from actions that change the scene state can be referred to as first-level simulated states, simulated states generated from actions that change first-level simulated states can be referred to as second-level simulates states, and so on.

At block 708, the planning system 404 generates a plurality of simulated trajectories. In certain cases, one or more simulated trajectories can correspond to a particular simulated state. For example, one or more simulated trajectories can begin at the particular simulated state.

In some cases, the simulated trajectories can end at an end state. As described herein, the end state can be determined by an end state policy and can correspond to any one or any combination of threshold time (e.g., simulation trajectory is to span six simulated seconds), threshold distance (e.g., simulation trajectory is to span ¼ of a mile), and/or a threshold landmark (e.g., pass an intersection, the next traffic sign, etc.), or other threshold.

In some cases, the number of simulated trajectories can be based on the number of simulated states. For example, the planning system 404 can generate one or more simulated trajectories for each of the simulated states. As another example, the planning system can generate at least one simulated trajectory for at least one simulated state. In some such cases, the planning system 404 may not generate a simulated trajectory for each of the simulated states.

In some cases, the planning system 404 can use a state selection policy to determine for which simulated states one or more simulated trajectories should be generated. As described herein the state selection policy can take into account the scores of different simulated states (based on the evaluation of previous simulated trajectories), the number of simulated trajectories generated for a particular simulated state (relative to other simulated states), action rankings, randomness or pseudo-randomness, and/or the last time a simulated trajectory was generated for a simulated state (relative to other simulated states), etc.

The planning system 404 can use a simulation policy to generate the simulated trajectories. As described herein, the simulation policy can indicate how to select and/or simulate one or more actions of the vehicle 200 (e.g., vehicle simulation policy) and/or one or more actions of the objects in the scene (e.g., object simulation policy). As described herein, the simulation policy may indicate that the one or more actions of the vehicle 200 may be randomly selected from all available actions, pseudo-randomly selected from all available actions (e.g., limited to actions that satisfy a safety threshold and/or comfort threshold, etc.), etc. Similarly, the simulation policy can indicate how different objects are to behave in the simulation. As described herein, the different objects can be simulated to act independent of each other, including objects of the of the same or different classifications. For example, the simulated actions of one vehicle 200 can be determined independent of the simulations of another vehicle and both can be determined independent of different pedestrians. In some cases, the objects can be simulated to act differently depending on their classification, location (e.g., on a road, sidewalk, crosswalk), proximity to the vehicle 200, size, etc. Moreover, the vehicle actions and object actions can be simulated to occur concurrently or simultaneously (e.g., without waiting for turns).

In some cases, the planning system can generate the simulated trajectories according to a simulation policy (e.g., simulation termination policy). The simulation policy can indicate how many simulated trajectories to generate and/or how long to generate simulated trajectories. For example, the simulation policy can indicate that the planning system 404 is to generate a threshold number of simulations (e.g., 1,000 trajectories), and/or generate simulated trajectories for a threshold period of time (e.g., 100 ms, 200 ms, 500 ms, etc.) or until a threshold amount of compute resources is used, etc. In certain cases, the simulation policy can indicate that the planning system 404 is to generate simulated trajectories until a threshold number of simulated states are identified and/or a threshold number of simulated trajectories are generated for one or more of the simulated states.

By exploring various actions (from the filtered set of actions), the planning system can obtain a more robust exploration of available actions/states, leading to a larger set of trajectories from which the planning system can select the action for the vehicle. In this way, the system can remain flexible in its planning process and less likely to select a path that results in a non-preferred outcome (e.g., dead-end, being stuck, collision, being in an unsafe location, etc.).

At block 710, the planning system 404 evaluates the plurality of simulated trajectories. As described herein, the planning system 404 can use a simulation policy (e.g., trajectory evaluation policy) to evaluate the simulated trajectories. The simulation policy can indicate how to evaluate and/or score the simulated trajectories.

In some cases, to evaluate the simulated trajectories, the planning system can extract individual features from the simulated trajectories, such as, but not limited to an acceleration profile, centrifugal force, turning profile, etc. Based on the simulation policy, the planning system 404 can score the individual features, weight them, and/or combine them to generate a score for the simulated trajectory. In some cases, the score for the simulated trajectory can include a score for some or all of the extracted features. In certain cases, the score for the simulated trajectory can include a composite score.

In some cases, the planning system 404 can use the score of the extracted features and/or the composite score to determine whether the simulated trajectory is considered a success or failure. In certain cases, the planning system 404 uses the score of the extracted features and/or composite score without assigning a success/failure value.

As described herein, the score for the simulated trajectory can be used to determine a score for the simulated state associated with the simulated trajectory (e.g., the simulated state from which the simulated trajectory begins). For example, the scores from the simulated trajectory associated with the same simulated state can be aggregated score to provide a simulated state score. In some cases, the simulated state score can be the number of simulated trajectories associated with the simulated state that were identified as being successful over the total number simulated trajectories associated with the simulated state as shown in FIG. 6G. In certain cases, the simulated state score can be a sum or average of the scores for the associated simulated trajectories. Other methods can be used to determine the score for the simulated state using the scores of the simulated trajectories.

Moreover, the scores of parent states or higher-level states can be based on the scores of lower-level or child states. For example, as illustrated in FIG. 6G, when a score for a lower-level state is updated, that change can be propagated to the higher-level states.

Although described separately, it will be understood that blocks 708 and 710 can be performed concurrently. In some cases, simulated trajectories can be generated and evaluated concurrently or successively. For example, as described herein with reference to FIGS. 6A-6G, the planning system can successively generate multiple levels of simulated states and generate and evaluate simulated trajectories for the different levels of generated simulated states. In certain cases, the planning system 404 can generate simulated states and simulated trajectories concurrently. For example, with reference to FIG. 6B, the planning system 404 can concurrently generate and evaluate the simulated trajectory 621A, as well as simulated trajectories from the first-level simulated states 622B and 622C. Similarly, with reference to FIG. 6F, the planning system 404 can concurrently generate and evaluate the simulated trajectory 621B, as well as simulated trajectories from any one or any combination of the first-level simulated states 622A, 622B or 622C, other second-level simulated states 624A, 624C, 624D, or even concurrently generate a second simulated trajectory from the second-level simulated state 624B.

At block 712, the planning system 404 selects an action for the vehicle 200 based on the simulated states. In certain cases, the planning system 404 can select the action based on a vehicle planning policy. As described herein, the vehicle planning policy can indicate the criteria by which the simulated states are evaluated and/or an action is selected. In some cases, such as where multiple levels of simulated states have been generated, the planning system 404 can, according to the vehicle planning policy, select an action that corresponds to one of the first-level simulated states. As such, the planning system 404 can use a subset of the simulated states to select the action.

It will be understood that the vehicle planning policy can indicate fewer, more, or different criteria to select an action. In certain cases, the criteria can include any one or any combination of a score for the simulated states, a number of simulated trajectories associated with the simulated states, etc.

At block 714, causes the vehicle 200 to perform the action. In some cases, the selected action can correspond to the action associated with the selected simulated state (e.g., the action that if taken by the vehicle 200 results in the simulated state). In certain cases, the planning system communicates the selected action to the control system 408, which controls the vehicle 200 to execute the action.

It will be understood that fewer, more, or different blocks can be used in routine 700. For example, after an action is selected and/or taken, the planning system 404 can repeated routine 700 based on new scene data and/or a new scene state. As the vehicle 200 is moving the new scene data (or second scene data) can include some or all of the objects from the first scene data as well as objects that not found in the first scene data. Moreover, the objects in the second scene data can act independent of each other, as described herein, and independent of the objects in the first scene data.

In some cases, as the new scene state may correspond to the selected simulated state referenced in block 714 and there may exist simulated trajectories associated with the selected simulated state and child (or any sub-level) simulated states of the selected simulated state, the planning system 404 can, in some cases, retain the previously generated simulated trajectories and child simulated states. In this way, the planning system 404 can continue to explore the child (or sub-level) simulated states of the selected simulated state without regenerating the data. In certain cases, the planning system can discard or not use the simulated trajectories and/or sub-level simulated states associated with the selected simulated state when the routine 700 is repeated.

In some cases, certain blocks of the routine 700 can be repeated. For example, if the simulated states referred to above are first-level simulated states, blocks 704-710 can be repeated relative to the first-level states (or for second-level and third-level simulated states) as desired according to the simulation policy (e.g., for a certain amount of time, until a particular number of simulated trajectories are generated, until a particular number of simulated states are explored, etc.).

As a non-limiting example, consider a scenario in which one or more first-level simulated states have been generated and one or more simulated trajectories have been generated and evaluated according to blocks 704-710. In such a scenario, the planning system can select one of the first-level simulated states for further exploration, determine actions for the vehicle 200 from the selected first-level simulated state (704), determine second-level simulated states based on determined actions (706), generate simulated trajectories based on the second-level simulated states (708), and evaluate the simulated trajectories and update scores for the relevant states (e.g., the corresponding second-level state, the selected first-level state, the scene state, etc.) (710).

As described herein, the first-level simulated state can be selected based on a state selection policy, which can take into account the score of the selected first-level simulated state (relative to other first-level simulated states), the number of simulations associated with the selected first-level simulated state relative to other first-level simulated states, etc.

Additional Examples

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
   obtaining scene data associated with a scene of a vehicle;
   determining a scene state of the scene based on the scene data;
   determining a plurality of available actions for the vehicle using the scene state, wherein a particular available action of the plurality of available actions corresponds to a particular instruction to control the vehicle;
   determining a plurality of simulated scene states using the plurality of available actions, wherein a particular simulated scene state of the plurality of simulated scene states corresponds to a simulation of the scene state resulting from the particular action of the plurality of available actions;
   generating a plurality of simulated trajectories for the vehicle using the plurality of simulated scene states, wherein a particular simulated trajectory of the plurality of simulated trajectories begins at the particular simulated scene state, wherein generating the particular simulated trajectory of the plurality of simulated trajectories includes simulating concurrent actions taken by a plurality of objects in the scene of the vehicle;
   evaluating the plurality of simulated trajectories;
   selecting an action from the plurality of available actions corresponding to a simulated scene state of the plurality of simulated scene states based on the evaluating the plurality of simulated trajectories; and
   causing the vehicle to execute the action.

2. The method of claim 1, wherein determining the plurality of available actions for the vehicle based on the scene data comprises identifying a list of physically possible actions and filtering out actions that do not satisfy a comfort threshold or safety threshold using a neural network.

3. The method of claim 1, further comprising:
   assigning scores to the plurality of simulated scene states based on the evaluating the plurality of simulated trajectories,
   wherein selecting the action based on the evaluating the plurality of simulated trajectories comprises selecting the action based on the scores assigned to the plurality of simulated scene states.

4. The method of claim 1, wherein obtaining the scene data includes receiving at least one of map data associated with a map corresponding to the scene, route data associated with a route for the vehicle, object data associated with at least one object identified in the scene, or location data associated with a location of the vehicle.

5. The method of claim 1, further comprising identifying at least one object in the scene and generating a predicted trajectory of the at least one object, wherein at least one simulated trajectory of the plurality of simulated trajectories is generated based on the predicted trajectory of the at least one object.

6. The method of claim 1, wherein the particular simulated trajectory includes a simulation of a plurality of successive actions by the vehicle.

7. The method of claim 1, wherein the plurality of available actions comprises at least one of accelerating, modifying a heading, decelerating, or maintaining velocity.

8. The method of claim 1, wherein evaluating the plurality of simulated trajectories comprises determining a trajectory score for each of the plurality of simulated trajectories.

9. The method of claim 1, wherein evaluating the plurality of simulated trajectories comprises evaluating the particular simulated trajectory by:
extracting a plurality of features from the particular simulated trajectory; and
determining a score for the particular simulated trajectory based at least in part on the plurality of features.

10. The method of claim 1, wherein evaluating the plurality of simulated trajectories comprises evaluating the particular simulated trajectory by:
extracting a plurality of features from the particular simulated trajectory;
determining a feature score for each feature of the plurality of features;
weighting each of the plurality of feature scores;
combining the plurality of weighted feature scores to determine a trajectory score for the particular simulated trajectory.

11. The method of claim 1, wherein selecting the action comprises selecting the action based on a safety level or comfort level associated with the action and/or associated with the simulated scene state associated with the action.

12. The method of claim 1, wherein the scene data comprises at least one of camera data, lidar data, or radar data.

13. The method of claim 1, wherein the plurality of available actions are a plurality of first actions, the plurality of simulated scene states are a plurality of first simulated scene states, the method further comprising:
scoring the plurality of simulated scene states based on the evaluating the plurality of simulated trajectories,
selecting the particular simulated scene state based on the scoring;
determining a plurality of second actions for the vehicle based on the particular simulated scene state;
determining a plurality of second simulated scene states based on the plurality of second actions, wherein a particular second simulated scene state of the plurality of second simulated scene states corresponds to a particular second action of the plurality of second actions;
generating a plurality of second simulated trajectories based on the plurality of second simulated scene states, wherein a particular second simulated trajectory of the plurality of second simulated trajectories begins at the particular second simulated scene state, wherein generating the particular second simulated trajectory includes simulating second concurrent actions taken by at least two objects of the plurality of objects in the scene of the vehicle;
evaluating the plurality of second simulated trajectories;
scoring the plurality of second simulated scene states based on the evaluating the plurality of simulated trajectories; and
updating a score of the particular simulated scene state based on the scoring the plurality of second simulated scene states,
wherein selecting a second action based on the evaluating the plurality of second simulated trajectories comprises selecting the second action based on the updating the score of the particular simulated scene state.

14. A system comprising:
a data store storing computer-executable instructions; and
at least one processor configured to execute the computer-executable instructions, wherein execution of the computer-executable instructions causes the system to:
obtain scene data associated with a scene of a vehicle;
determine a scene state of the scene based on the scene data;
determine a plurality of available actions for the vehicle using the scene state, wherein a particular available action of the plurality of available actions corresponds to a particular instruction to control the vehicle;
determine a plurality of simulated scene states using the plurality of available actions, wherein a particular simulated scene state of the plurality of simulated scene states corresponds to a simulation of the scene state resulting from the particular action of the plurality of available actions;
generate a plurality of simulated trajectories for the vehicle using the plurality of simulated scene states, wherein a particular simulated trajectory of the plurality of simulated trajectories begins at the particular simulated scene state, wherein to generate the particular simulated trajectory of the plurality of simulated trajectories, wherein execution of the computer-executable instructions further causes the system to simulate concurrent actions taken by a plurality of objects in the scene of the vehicle;
evaluate the plurality of simulated trajectories;
select an action from the plurality of available actions corresponding to a simulated scene state of the plurality of simulated scene states based on the evaluation of the plurality of simulated trajectories; and
cause the vehicle to execute the action.

15. The system of claim 14, wherein execution of the computer-executable instructions causes the system to:
assign scores to the plurality of simulated scene states based on the evaluation of the plurality of simulated trajectories,
wherein to select the action based on the evaluation of the plurality of simulated trajectories, execution of the computer-executable instructions causes the system to select an action based on the scores assigned to the plurality of simulated scene states.

16. The system of claim 14, wherein the plurality of available actions are a plurality of first actions, the plurality of simulated scene states are a plurality of first simulated scene states, and wherein execution of the computer-executable instructions causes the system to:
score the plurality of simulated scene states based on the evaluation of the plurality of simulated trajectories,
select the particular simulated scene state based on a score of the particular simulated scene state;
determine a plurality of second available actions for the vehicle based on the particular simulated scene state;
determine a plurality of second simulated scene states based on the plurality of second available actions, wherein a particular second simulated scene state of the plurality of second simulated scene states corresponds to a particular second action of the plurality of second available actions;
generate a plurality of second simulated trajectories based on the plurality of second simulated scene states, wherein a particular second simulated trajectory of the plurality of second simulated trajectories begins at the particular second simulated scene state, wherein the particular second simulated trajectory includes a second simulation of concurrent actions taken by at least two objects of the plurality of objects in the scene of the vehicle;

evaluate the plurality of second simulated trajectories;

score the plurality of second simulated scene states based on the evaluation of the plurality of simulated trajectories; and update a score of the particular simulated scene state based on the scoring of the plurality of second simulated scene states, wherein to select a second action based on the evaluation of the plurality of simulated trajectories, execution of the computer-executable instructions causes the system to select the second action based on the updated score of the particular simulated scene state.

17. One or more non-transitory computer-readable media comprising computer-executable instructions that, when executed by a computing system, causes the computing system to:

obtain scene data associated with a scene of a vehicle;

determine scene state of the scene based on the scene data;

determine a plurality of available actions for the vehicle using the scene state, wherein a particular available action of the plurality of available actions corresponds to a particular instruction to control the vehicle;

determine a plurality of simulated scene states using the plurality of available actions, wherein a particular simulated scene state of the plurality of simulated scene states corresponds to a simulation of the scene state resulting from the particular action of the plurality of available actions;

generate a plurality of simulated trajectories for the vehicle using the plurality of simulated scene states, wherein a particular simulated trajectory begins at the particular simulated scene state, wherein the particular simulated trajectory of the plurality of simulated trajectories includes a simulation of concurrent actions taken by a plurality of objects in the scene of the vehicle;

evaluate the plurality of simulated trajectories;

select an action from the plurality of available actions corresponding to a simulated scene state of the plurality of simulated scene states based on the evaluation of the plurality of simulated trajectories; and cause the vehicle to execute the action.

18. The one or more non-transitory computer-readable media of claim 17, wherein execution of the computer-executable instructions causes the computing system to:

assign scores to the plurality of simulated scene states based on the evaluation of the plurality of simulated trajectories, wherein to select the action based on the evaluation of the plurality of simulated trajectories, execution of the computer-executable instructions causes the computing system to select the action based on the scores assigned to the plurality of simulated scene states.

19. The one or more non-transitory computer-readable media of claim 17, wherein the plurality of available actions are a plurality of first actions, the plurality of simulated scene states are a plurality of first simulated scene states, and wherein execution of the computer-executable instructions causes the computing system to:

score the plurality of simulated scene states based on the evaluation of the plurality of simulated trajectories, select the particular simulated scene state based on a score of the particular simulated scene state;

determine a plurality of second available actions for the vehicle based on the particular simulated scene state;

determine a plurality of second simulated scene states based on the plurality of second available actions, wherein a particular second simulated scene state of the plurality of second simulated scene states corresponds to a particular second action of the plurality of second available actions;

generate a plurality of second simulated trajectories based on the plurality of second simulated scene states, wherein a particular second simulated trajectory of the plurality of second simulated trajectories begins at the particular second simulated scene state, wherein to generate the particular second simulated trajectory, execution of the computer-executable instructions causes the computing system to simulate second concurrent actions taken by at least two objects of the plurality of objects in the scene of the vehicle;

evaluate the plurality of second simulated trajectories based;

score the plurality of second simulated scene states based on the evaluation of the plurality of simulated trajectories; and update a score of the particular simulated scene state based on the scoring of the plurality of second simulated scene states, wherein to select the action based on the evaluation of the plurality of first simulated trajectories, execution of the computer-executable instructions causes the computing system to select the action based on the updated score of the particular simulated scene state.

* * * * *